US008684745B2

(12) United States Patent
Chen et al.

(10) Patent No.: US 8,684,745 B2
(45) Date of Patent: Apr. 1, 2014

(54) HAND-HELD PERSONAL PLANETARIUM

(75) Inventors: Chin Chuan Chen, Richmond (CA);
Yan Liu, Richmond (CA); Dar-Tson Shen, West Vancouver (CA)

(73) Assignee: Pacific Telescope Corp., Richmond (CA)

( * ) Notice: Subject to any disclaimer, the term of this patent is extended or adjusted under 35 U.S.C. 154(b) by 997 days.

(21) Appl. No.: 12/367,447

(22) Filed: Feb. 6, 2009

(65) Prior Publication Data
US 2010/0124735 A1 May 20, 2010

(51) Int. Cl.
G09B 27/00 (2006.01)

(52) U.S. Cl.
USPC .......................................... 434/285; 434/289

(58) Field of Classification Search
USPC ...................... 434/284–289; 33/268; 701/513
See application file for complete search history.

(56) References Cited

U.S. PATENT DOCUMENTS

| 5,311,203 | A | 5/1994 | Norton |
| 6,366,212 | B1 | 4/2002 | Lemp, III |
| 6,570,506 | B2 | 5/2003 | Lemp, III |
| 6,844,822 | B2 | 1/2005 | Lemp, III |
| 7,068,180 | B2 | 6/2006 | Lemp, III |
| 7,197,829 | B2 * | 4/2007 | Acres ............................. 33/268 |
| 7,438,422 | B1 * | 10/2008 | Castellano .................... 353/79 |
| 2007/0159390 | A1 * | 7/2007 | Kim ......................... 342/357.13 |
| 2007/0279238 | A1 * | 12/2007 | Smith et al. ............... 340/686.6 |
| 2008/0163504 | A1 | 7/2008 | Smith et al. |
| 2008/0168492 | A1 | 7/2008 | Baun et al. |

OTHER PUBLICATIONS

Internet printout describing features of MySky product for sale by Meade Instruments Corp. (http://www.meade.com/mysky/) available before Feb. 6, 2009.
Internet printout describing features of Sky Scout product for sale by Celestron, L.L.C. (http://www.celestron.com/skyscout/) available before Feb. 6, 2009.
Internet printout describing features of Starry Night software for sale by Imaginova, Corp. (http://www.starrynightstore.com) dated Feb. 6, 2009.
Internet printout describing features of SkyMap software for sale by SkyMap Software (http://www.skymap.com) dated May 10, 2006.
Internet printout describing features of TheSky software for sale by Software Bisque, Inc. (http://www.bisque.com) available before Feb. 6, 2009.
Sky Scout Personal Planetarium User Manual, available before Feb. 6, 2009.
My Sky Instruction Manual, available before Feb. 6, 2009.

* cited by examiner

*Primary Examiner* — Peter Egloff
(74) *Attorney, Agent, or Firm* — Oyen Wiggs Green & Mutala LLP

(57) ABSTRACT

Method and apparatus are provided for a hand-held planetarium which displays a sky pattern comprising graphical representations of one or more celestial objects. A sensing system comprising one or more sensors provides information about an orientation of the device. A controller receives the information about the orientation of the device from the sensing system and determines therefrom an altitude angle of a pointing axis and an azimuthal angle of the pointing axis. The controller accesses a database of celestial objects and determines, from within the database, one or more selected celestial objects for display based at least in part on a measure of proximity of the celestial objects to the pointing axis. Graphical representations of the one or more selected celestial objects are displayed on a display screen. The planetarium may switch between a normal orientation mode and a downward facing orientation mode.

61 Claims, 11 Drawing Sheets

HAND-HELD PERSONAL PLANETARIUM

TECHNICAL FIELD

The invention relates to personal planetarium devices which display representations of, and/or information related to, celestial objects and methods for using same.

BACKGROUND

Humans have been interested in celestial observation and the science of astronomy since at least the time of Copernicus. For amateur astronomers, it can be difficult to identify particular celestial objects, to locate particular objects by name or to locate deep space objects (DSOs).

The prior art has evolved a number of devices which may be used by amateur astronomers to identify celestial objects viewed through their respective viewing channels. Such devices are disclosed, for example, in:

U.S. Pat. No. 5,311,203;
U.S. Pat. No. 6,366,212;
U.S. Pat. No. 6,570,506;
U.S. Pat. No. 6,844,822;
U.S. Pat. No. 7,068,180;
US patent application No. 2008/0168492; and
US patent application No. 2008/0163504.

The prior art has also evolved so-called planetarium software for use on personal computers. Such planetarium software receives user input, such as longitude, latitude, local time, compass heading angle (azimuth) and elevation angle. In response to this input, the planetarium software displays, on the computer monitor, representations of a corresponding area of the night sky including pre-stored representations of celestial objects and their names. Examples of such planetarium software include:

SkyMap™ from SkyMap Software of Chesire, England;
Starry Night™ from Imaginova, Corp. Santa Crux, Calif.; and
TheSky™ from Software Bisque, Inc. of Golden, Colo.

These prior art devices and software can be difficult to use with ease and/or accuracy. There remains a general desire for personal planetarium devices which can be used with ease and accuracy.

BRIEF DESCRIPTION OF THE DRAWINGS

In drawings which depict non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Aspects of the invention provide apparatus and operational methods for a hand-held planetarium which displays a sky pattern comprising graphical representations of one or more celestial objects. A sensing system comprising one or more sensors provides information about an orientation of the device. A controller receives the information about the orientation of the device from the sensing system and determines therefrom an altitude angle of a pointing axis and an azimuthal angle of the pointing axis. The controller accesses a database of celestial objects and determines, from within the database, one or more selected celestial objects for display based at least in part on a metric of proximity of the celestial objects to the pointing axis. Graphical representations of the one or more selected celestial objects are displayed on a display screen.

The device may be operated in a normal orientation mode or a downward facing orientation mode where a modified pointing axis is substituted in place of the original pointing axis for determining the one or more selected celestial objects for display. The altitude coordinate of the modified pointing axis may be positive even though the altitude of the original pointing axis is negative. In some embodiments, the modified pointing axis may be selected to be one of the original device-plane axes. In other embodiments, a suitable rotation transformation (or a suitable combination of rotation transformations) may be applied to the original pointing axis and device-plane axes to select the modified pointing axis. Such rotation transformation(s) may involve rotation of the original pointing axis and device-plane axes about one of the device-plane axes.

Figure 1:
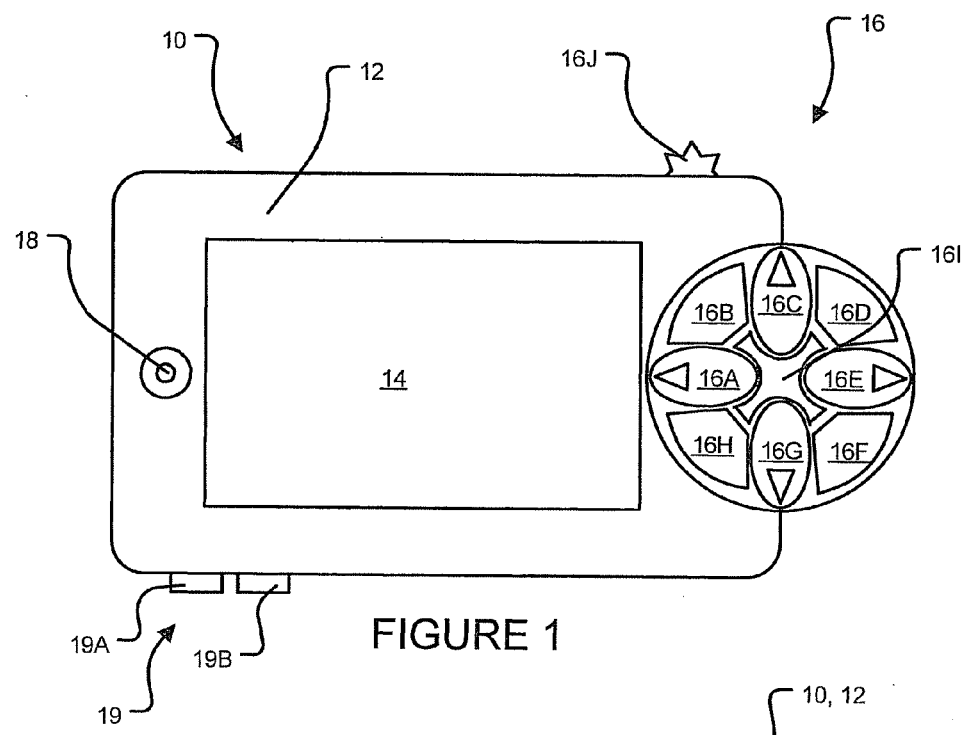
FIG. 1 is a plan view of the user interface side of a personal planetarium device according to a particular embodiment of the invention.

FIG. 1 is a plan view of a personal planetarium device 10 according to a particular embodiment of the invention. Device 10 is contained in a housing 12. Preferably, housing 12 is sufficiently small that device 10 may be hand held by a user and/or fit in a user's pocket or the like. In particular embodiments, housing 12 may be on the order of the size of a mobile communication device or a personal digital assistant (PDA) device.

Device 10 comprises a graphical user interface which may include a display 14 and one or more user inputs 16. In the illustrated embodiment, user inputs 16 comprise a series of user input buttons 16A-16I and push-wheel 16J. User inputs 16 may function to allow a user to input information into device 10 and display 14 may function to allow device 10 to output information to a user. As explained in more detail below, display 14 may also display representations of the night sky and of celestial objects contained therein together with information about such representations. In other embodiments, display 14 may comprise a so-called touch screen display, wherein display 14 also functions to provide one or more user inputs 16.

In the illustrated embodiment, device 10 also comprises a motion and/or proximity sensor 18 which may sense the motion or proximity of a user and which may take one or more actions (e.g. turning device 10 ON or OFF) in response to detection of the presence or the lack of presence of a user in proximity to device 10. By way of non-limiting example, motion/proximity sensor 18 may comprise an infrared or near infrared sensor, an acoustic sensor or the like. While turning on device 10 represents one example of an action which may be taken in response to detection (by sensor 18) of user movement/proximity, other actions may be taken in response to detection of a user movement/proximity (by sensor 18). By way of non-limiting example, device 10 may remain active, but display 14 may activate/deactivate in response to feedback from sensor 18, device 10 may switch operational modes in response to feedback from sensor 18, device 10 may provide audio information or graphical information (e.g. static graphical content or video content) in response to feedback from sensor 18, or the like.

Device 10 may also comprise one or more input/output (I/O) ports 19 for communication with other electronic devices (not shown). In the illustrated embodiment, I/O ports 19 of device 10 comprise a USB port 19A and a serial port 19B. Device 10 may comprise other types of I/O ports 19, including without limitation wireless I/O communications interfaces.

Figure 2:
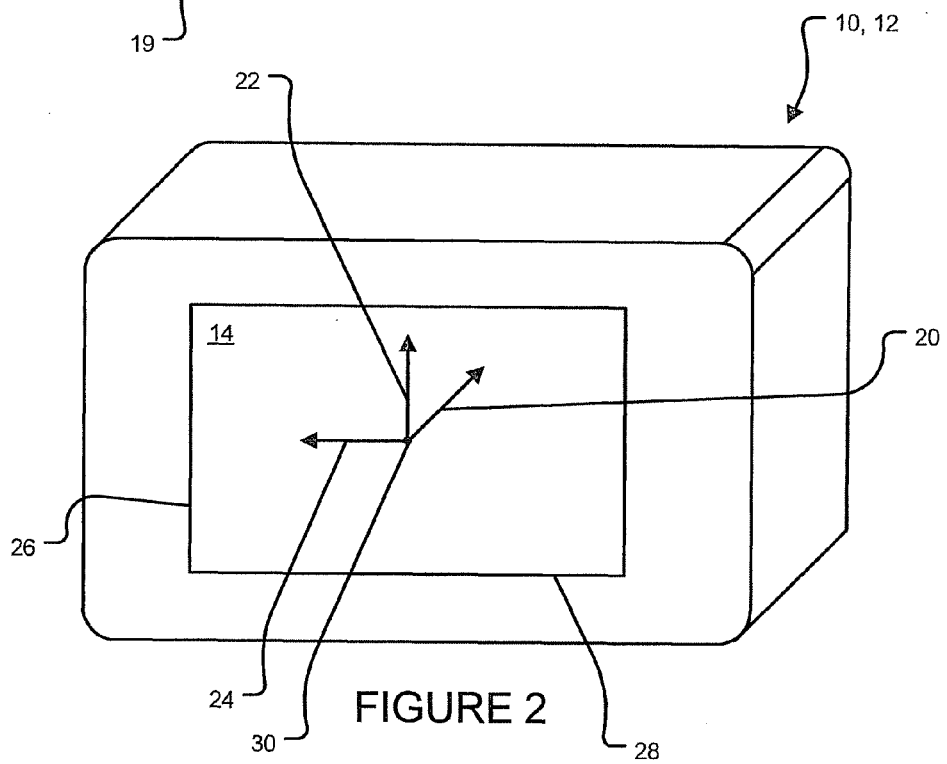
FIG. 2 is a schematic illustration of a number of reference axes used in this description in relation to the FIG. 1 device.

FIG. 2 schematically illustrates a number of reference axes referred to in this description in relation to device 10, housing 12 and screen 14. Reference axes 22 and 24 represent a pair of orthogonal reference axes in a plane of screen 14. In the illustrated embodiment, reference axis 22 is generally parallel to one edge 26 of screen 14 and orthogonal reference axis 24 is generally parallel to another edge 28 of screen 14 although this is not necessary. Reference axes 22, 24 may be referred to as device-plane axes 22, 24. FIG. 2 also depicts a third axis 20 which is generally orthogonal to both device-plane axes 22, 24 and is generally normal to screen 14. Third axis 20 may be referred to as the pointing axis 20 of device 10. It may be assumed, for the purposes of this description that device-plane axes 22, 24 and pointing axis 20 intersect at location 30 which may be located at or near the center of screen 14. Location 30 may be referred to as the origin 30 of device 10.

Figure 3:
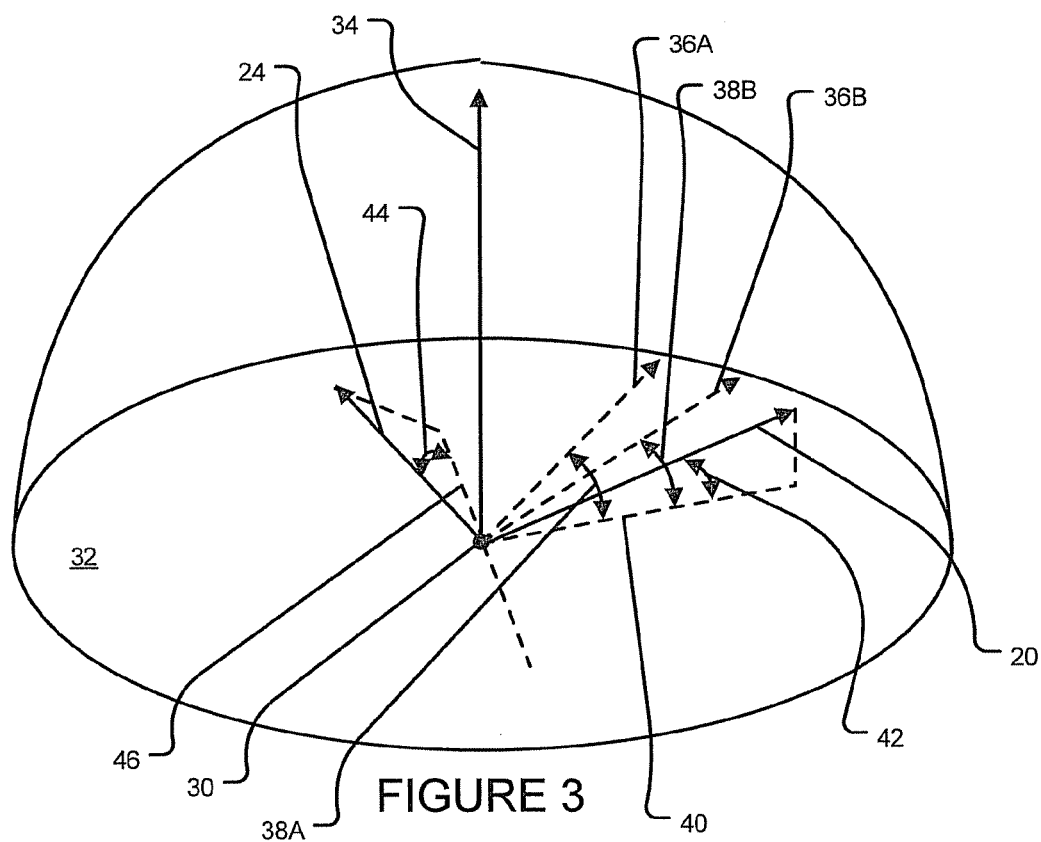
FIG. 3 is a schematic illustration of a number of additional directional conventions used in this description.

FIG. 3 schematically illustrates a number of additional reference directions used in this description. It is assumed, for the purposes of explaining FIG. 3, that origin 30 of device 10 is located on a horizontal plane 32 at or near the surface of the earth. In the FIG. 3 illustration, reference lines located on horizontal plane 32 are shown in dashed outline and reference lines that extend off of horizontal plane 32 are shown in solid lines. Reference lines 36A and 36B on horizontal plane 32 respectively represent the directions of true north and magnetic north. Line 34 represents the zenith which extends through origin 30 to the center of the earth (not shown) in a direction normal to horizontal surface 32.

FIG. 3 also shown pointing axis 20 of device 10 and device-plane axis 24. It is assumed in the FIG. 3 illustration, that pointing axis 20 is oriented so as to be directed toward the night sky (i.e. above horizontal plane 32). Line 40 represents the projection of pointing axis 20 onto horizontal plane 32. The angle 42 between pointing axis 20 and line 40 may be referred to as the altitude 42 or altitude angle 42. The angle 38A between true north 36A and line 40 may be referred to as the azimuth 38A or the azimuthal angle 38A. The angle 38B between magnetic north 36B and line 40 may be referred to as the magnetic azimuth 38B and is related to azimuth 38A via the magnetic declination at the location of device 10. Line 46 represents the intersection of the plane of screen 14 (i.e. the plane containing device-plane axes 22, 24) and horizontal plane 32. In the mathematical convention of Euler angles, line 46 may be referred to as the line of nodes. The angle 44 between device-plane axis 24 and line 46 may be referred to as the roll 44 or roll angle 44. The combination of altitude 42 and roll 44 may be referred to as the attitude of device 10.

Figure 4:
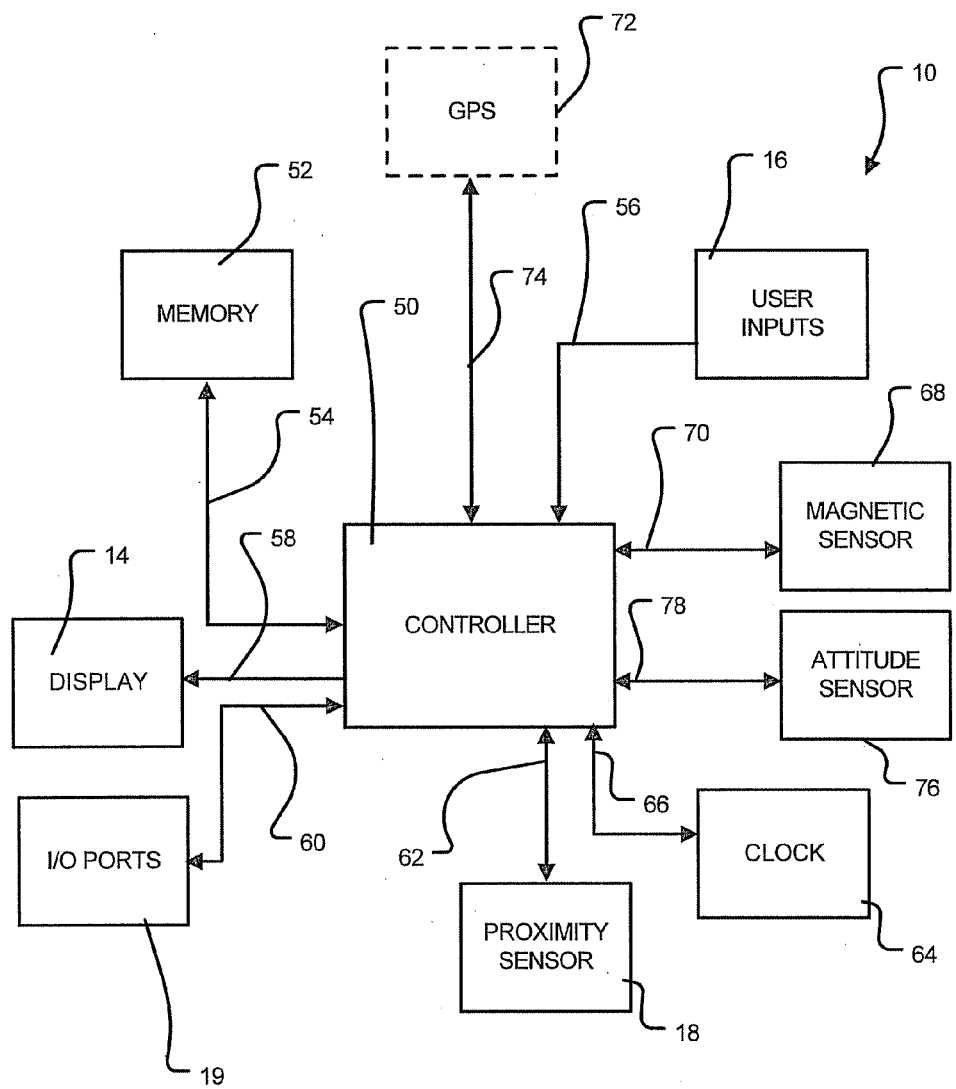
FIG. 4 is a block diagram schematically illustrating a number of the components of the FIG. 1 device.

FIG. 4 is a block diagram schematically illustrating a number of the components of device 10. Device 10 is controlled by controller 50. In particular embodiments, controller 50 is implemented by one or more embedded processors. In general, however, controller 50 may comprise any suitable combination of hardware and software capable of operating as described herein. By way of non-limiting example, controller 50 may comprise one or more suitably programmed data processors, memory and interface hardware and/or software. Controller 50 may comprise one or more programmable computers, which may control the operation of device 10 through I/O ports 19.

Although not explicitly shown in the block diagram representation of FIG. 4, device 10 may be understood to incorporate various interface electronics as desirable for interfacing between controller 50 and the various other components of device 10. By way of non-limiting example, such interface electronics may comprise amplifiers, data buffers, data registers, analog to digital and digital to analog converters and the like.

Controller 50 has access to, and interacts with, memory 52 via signals 54. Memory 52 may comprise RAM memory and/or ROM memory. In some embodiments, portions of memory 52 may be internal to controller 50. Memory 52 may store software instructions (not explicitly shown), which when executed by controller 50, cause controller 50 to operate device 10 as described herein. Memory 52 may also store a celestial object database (not explicitly shown) and parameters thereof, as described in more detail below.

As described briefly above, controller 50 may receive inputs from one or more user inputs 16 via signals 56 and may control the output on display 14 via signals 58. In addition, controller 50 may receive input from, and/or provide output to, other electronic devices using I/O ports 19 and signals 60. Controller 50 may also receive signals 62 from I/O sensor 18 which may be used by controller 50 to takes action(s) as described above.

In the illustrated embodiment, device 10 includes a clock 64 which may provide the current local time to controller 50 via clock signals 66. In some embodiments, clock 64 may be a real time clock, which may provide year, date and time data and which may be backed up by battery. In some embodiments, clock 64 may be configured (e.g. set and/or updated) by a user via user inputs 16 or by an external electronic device (not shown) via I/O ports 19. In other embodiments, controller 50 may be programmed to configure (e.g. set and/or update) clock 64, in response to other information (e.g. location of device 10 and current date) which may be provided via user inputs 16 or via I/O ports 19, for example. In particular embodiments, clock 64 is configured to provide controller 50 with date information. In other embodiments, device 10 may comprise other techniques and/or other devices (not shown) for keeping track of date information. By way of non-limiting example, a user may input a date once during initialization (e.g. via user inputs 16) and then controller 50 may maintain a calendar function which increments the date each time that clock 64 reaches 24:00 hours. Device 10 could incorporate any other techniques and/or devices for keeping track of the date which are known or become known to those skilled in the art. Without limiting the generality of the foregoing, it is assumed in the remainder of this description that clock signals 66 include date information.

Device 10 comprises an attitude sensor 76 which provides information correlated with altitude angle 42 and roll angle 44 to controller 50 via attitude signals 78. As discussed above, device 10, attitude sensor 76 and/or controller 50 may comprise suitable interface electronics (not explicitly shown) for processing attitude signals 78. In one particular embodiment, attitude sensor 76 comprises a plurality (e.g. three) tilt sensors (not expressly shown) oriented orthogonally to one another. In one particular embodiment, attitude sensor 76 is oriented within housing 12 such that the three axes of its tilt sensors are generally aligned with device-plane axes 22, 24 and with pointing axis 20, although other orientations of the axes of the tilt sensors are also possible. Controller 50 receives attitude signals 78 and uses attitude signals 78 to ascertain altitude angle 42 and roll angle 44 (FIG. 3).

In other embodiments, attitude sensor 76 may comprise different types of sensors. For example, attitude sensor 76 may comprise a different number of tilt sensors, one or more gyroscopes, one or more optical sensors, one or more gravity sensors or the like. U.S. Pat. No. 6,570,506 (which is hereby incorporated herein by reference) describes a number of gravitational sensors for sensing a so-called nadir angle. Any of these sensors could be used to implement attitude sensor 76.

Device 10 comprises a magnetic sensor 68 which provides information to controller 50 via magnetic sensor signals 70. The information provided by magnetic sensor 68 may be related to azimuth angle 38A, as discussed in more detail below. Device 10, magnetic sensor 68 and/or controller 50 may comprise suitable interface electronics (not explicitly shown) for processing magnetic sensor signals 70. In one particular embodiment, magnetic sensor 68 comprises a plurality (e.g. three) magnetic sensors (not expressly shown) oriented orthogonally to one another. Magnetic sensors 68 of this type are known in the art and may comprise individual magnetic sensors or may come pre-fabricated with three orthogonal magnetic sensors. In one particular embodiment, magnetic sensor 68 is oriented within housing 12 such that the three axes of its three magnetic sensors are generally aligned with device-plane axes 22, 24 and with pointing axis 20, although other orientations of the axes of the magnetic sensors are also possible.

Magnetic sensor 68 may comprise different types of individual magnetic sensors, such as, by way of non-limiting example, magnetic resonance sensors, magnetic flux-gate sensors, Hall effect sensors or the like. In some embodiments, magnetic sensor 68 may comprise a different number of individual magnetic sensors.

Magnetic sensor 68 senses the earth's magnetic field and outputs magnetic sensor signals 70 which are received by controller 50. In currently preferred embodiments, controller 50 uses magnetic sensor signals 70 together with the altitude angle 42 and roll angle 44 (as determined from attitude signals 78) to determine the three-dimensional magnetic azimuthal orientation 38B of device 10 relative to magnetic north 36B (FIG. 3). Controller 50 may then use magnetic azimuthal orientation 38B together with local magnetic declination information to ascertain azimuth angle 38A relative to true north 36A. As is well known, magnetic declination information represents the local difference between magnetic north 36B and true north 36A (FIG. 3).

Magnetic declination information may be obtained from a user via user inputs 16. For example, a user may be prompted to, or may otherwise, enter the local magnetic declination at the location where device 10 is being used via user inputs 16. As another example, controller 50 may be provided with, or may have access to, magnetic declination reference data (e.g. a database, a look up table or the like) which maps the local magnetic declination to geographic coordinates (e.g. latitude and longitude, the name of the closest city or town or the like) and a user may be prompted to, or may otherwise, enter the local geographic coordinates via user inputs 16. Controller 50 may then use these geographic coordinates together with the magnetic declination reference data to obtain the local magnetic declination. The magnetic declination reference data may be stored locally to device 10 (e.g. in memory 52) or may be accessible to device 10 via I/O ports 19. In other embodiments, device 10 may comprise optional GPS unit 72 which may provide geographic coordinates to controller 50 via signals 74 (i.e. in addition to or as an alternative to obtaining geographic coordinates via user inputs 16).

Device 10 may optionally comprise GPS unit 72 which may provide geographic coordinates (e.g. latitude and longitude) to controller 50 via signals 74. In other embodiments, GPS unit 72 is not required and geographic coordinates may be input to controller 50 by a user via user inputs 16. For example, a user may be prompted to, or may otherwise, enter the local latitude and longitude at the location where device 10 is being used via user inputs 16. As another example, controller 50 may be provided with, or may have access to, latitude and longitude reference data (e.g. a database, a look up table or the like) which maps latitude and longitude to simplified geographical indicators (e.g. the name of the closest city or town or the like) and a user may be prompted to, or may otherwise, enter the simplified geographical indicators via user inputs 16. Controller 50 may then use these simplified geographical indicators together with the longitude and latitude reference data to obtain the local longitude and latitude. The longitude and latitude reference data may be stored locally to device 10 (e.g. in memory 52) or may be accessible to device 10 via I/O ports 19.

Figure 5:
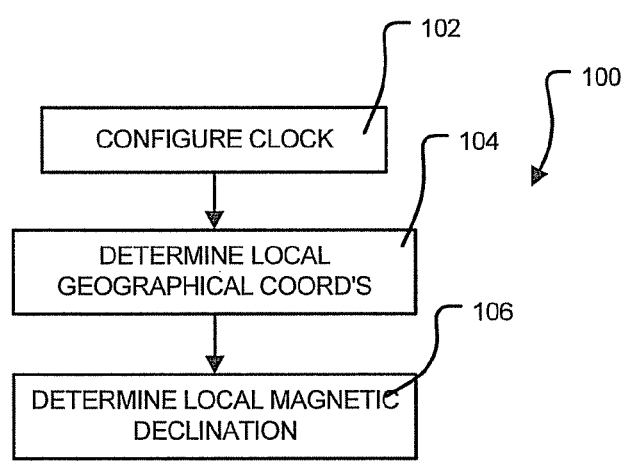
FIG. 5 shows a method for initializing the FIG. 1 device according to a particular embodiment of the invention.

FIG. 5 shows a method 100 for initializing device 10 according to a particular embodiment of the invention. Method 100 may be implemented (at least in part) by controller 50 (FIG. 4) running suitable software. Method 100 commences in block 102 which involves configuring clock 64. In embodiments, where clock 62 is a real time clock with a battery back up, a user may verify the accuracy of the configuration of clock 64 in block 102. In other embodiments, block 102 may involve configuring clock 64 according to any of the methods described above.

Method 100 then proceeds to block 104 which involves obtaining the latitude and longitude of the location in which device 10 is being used. Block 104 may involve any of the methods discussed above to obtain latitude and longitude information via user inputs 16 and/or via GPS unit 72. The longitude obtained in block 104 may also be used by controller 50 to determine the time zone of the location in which device 10 is being used and whether daylight savings is in effect. For example, controller 50 may have access to time zone/daylight savings reference data (e.g. a look up table or the like, which may be locally stored in memory 52 or may be accessible via I/O ports 19) which maps longitude to time zone and which maps latitude and longitude to daylight savings customs. The block 102 local time and the block 104 time zone/daylight savings information can be used by controller 50 to determine the Greenwich mean time, which may then be used to determine the local sidereal time, as discussed in more detail below.

Method 100 then proceeds to block 106 which involves obtaining the local magnetic declination. Block 106 may involve obtaining the local magnetic declination in any of the ways described above (e.g. by direct user input or by determining the local magnetic declination based on the block 104 geographical information and suitable magnetic declination reference data).

Figure 6:
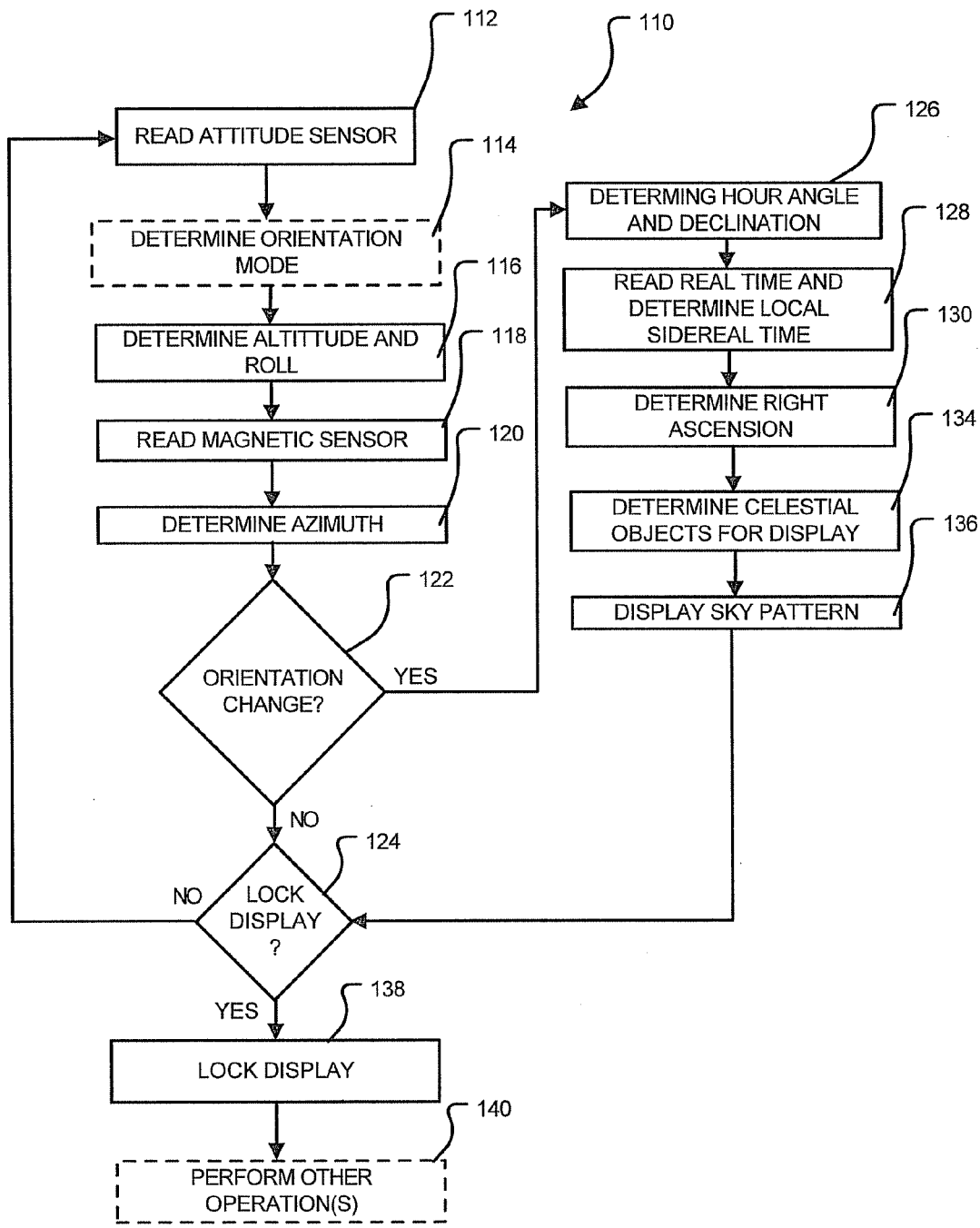
FIG. 6 shows a method 110 for operating device 10 to display a sky pattern comprising representations of celestial objects according to a particular embodiment.

FIG. 6 shows a method 110 for operating device 10 to display (on display 14) a sky pattern comprising representations of celestial objects according to a particular embodiment. Method 110 may be implemented (at least in part) by controller 50 (FIG. 4) running suitable program instructions. Initialization method 100 (FIG. 5) may be performed prior to performing method 110. To use device 10 in accordance with method 110, a user may orient device 10 such that pointing axis 20 is directed toward the sky. Method 110 may then involve displaying (on display 14) a sky pattern comprising representations of celestial objects located in a vicinity of pointing axis 20.

Method 110 commences in block 112 which involves reading attitude signals 78 from attitude sensor 76 as described above. Block 114 is an optional block involving determining an orientation mode of device 10 which is described in more detail below. Method 110 then proceeds to block 116. Block 116 may involve using the block 112 attitude signals 78 to determine altitude 42 and roll 44 of pointing axis 20. Where device 10 is in its normal orientation mode, the altitude 42 and roll 44 of pointing axis 20 may be determined from attitude signals 78 as described above. When device 10 is in its downward facing orientation mode, block 116 may involve controller 50 determining suitably modified altitude and optionally roll coordinates associated with a modified pointing axis, as described in more detail below.

Method 110 then proceeds to block 118 which involves reading magnetic sensor signals 70 from magnetic sensor 68 as described above. In block 120, controller 50 determines azimuth angle 38A using the block 118 information read from magnetic sensor 68 and the local magnetic declination information as described above. In some embodiments, controller 50 may also use one or more of roll angle 44 and/or altitude angle 42 determined in block 116 to help determine a three-dimensional azimuth angle 38A. When device 10 is in its downward facing orientation mode, block 120 may involve controller 50 determining a suitably modified azimuth coordinate associated with a modified pointing axis, as described in more detail below. Method 110 then proceeds to block 122 which involves an inquiry as to whether altitude 42, roll 44 and/or azimuth 38A have changed since the last iteration of method 110. If there has been no change (block 122 NO output), then method 110 proceeds to block 124 which involves an inquiry as to whether the user has locked display 14. A user may lock display 14 using one or more of user inputs 16. Assuming for the time being that the user has not locked display 14 (block 124 NO output), then method 110 loops back to block 112. If there has been a change in one or more of altitude 42, roll 44 and/or azimuth 38A (block 122 YES output), then method 110 proceeds to block 126. The block 122 inquiry may be involve a thresholding process—e.g. an inquiry as to whether the measured altitude 42, roll 44 and/or azimuth 38A has changed by more than threshold amounts. The block 122 inquiry may also involve a temporal filtering process—e.g. inquiry as to whether the measured altitude 42, roll 44 and/or azimuth 38A has changed by more than threshold amount(s) for sufficiently long period(s) of time. While not explicitly shown in FIG. 6, the block 122 inquiry may return a positive result (block 122 YES output) on its first iteration or when the user-selected zoom level changes, even in cases where there has been no change in altitude 42, roll 44 or azimuth 38A.

In block 126 of the illustrated embodiment, method 110 involves determining the hour angle (HA) and declination (DEC) coordinates associated with the direction of pointing axis 20. The block 126 determination may be based on the block 116 altitude 42, the block 120 azimuth 38A and the latitude of the location in which device 10 is being used. The details of this block 126 determination of HA and DEC are well known to those skilled in the art of astronomy. While sufficient accuracy of the HA and DEC coordinates can generally be obtained from altitude 42, azimuth 38A and the latitude of the location in which device 10 is being used, in some embodiments, the block 126 calculation of HA and DEC may also be based on other parameters.

Method 110 then proceeds to block 128 which involves determining the local sidereal time (LST) at the location in which device 10 is being used. There are a variety of suitable techniques for determining the LST based on information available to controller 50 which are known to those skilled in the art of astronomy. Block 128 may involve any such technique. Determining the LST in block 128 may involve reading the current local time and date from clock 64 on clock signals 66. Determining the LST may also involve use of the longitude, the time zone in which device 10 is operating and/or whether daylight savings is in effect at the location in which device 10 is operating. In one particular embodiment, determination of the LST may be accomplished by converting the local time and date to a universal time (which may involve use of the time zone and/or the existence of daylight savings at the location in which device 10 is being used), using the universal time to determine the Greenwich sidereal time (GST) and then using GST together with the longitude at the location of device 10 to determine the LST. Block 128 may use other techniques and/or approximations to determine the LST.

Method 110 then proceeds to block 130 which involves using the block 128 LST and the block 126 HA to determine the right ascension (RA). RA is related to LST and HA according to RA=LST−HA. At the conclusion of block 130, controller 50 has access to the current DEC and RA associated with pointing axis 20. In block 134, controller 50 accesses a database of celestial objects to determine which of the celestial objects in the database are sufficiently proximate to pointing axis 20 so as to be selected for display on display 14. The degree of proximity to pointing axis 20 for a particular celestial object to be selected for display in block 134 may be based on one or more proximity threshold(s). Such proximity threshold(s) may in turn be based on a user-controlled zoom level which may be set by one or more of user inputs 16. A method for implementing block 134 according to a particular embodiment of the invention is explained in more detail below.

Figure 7:
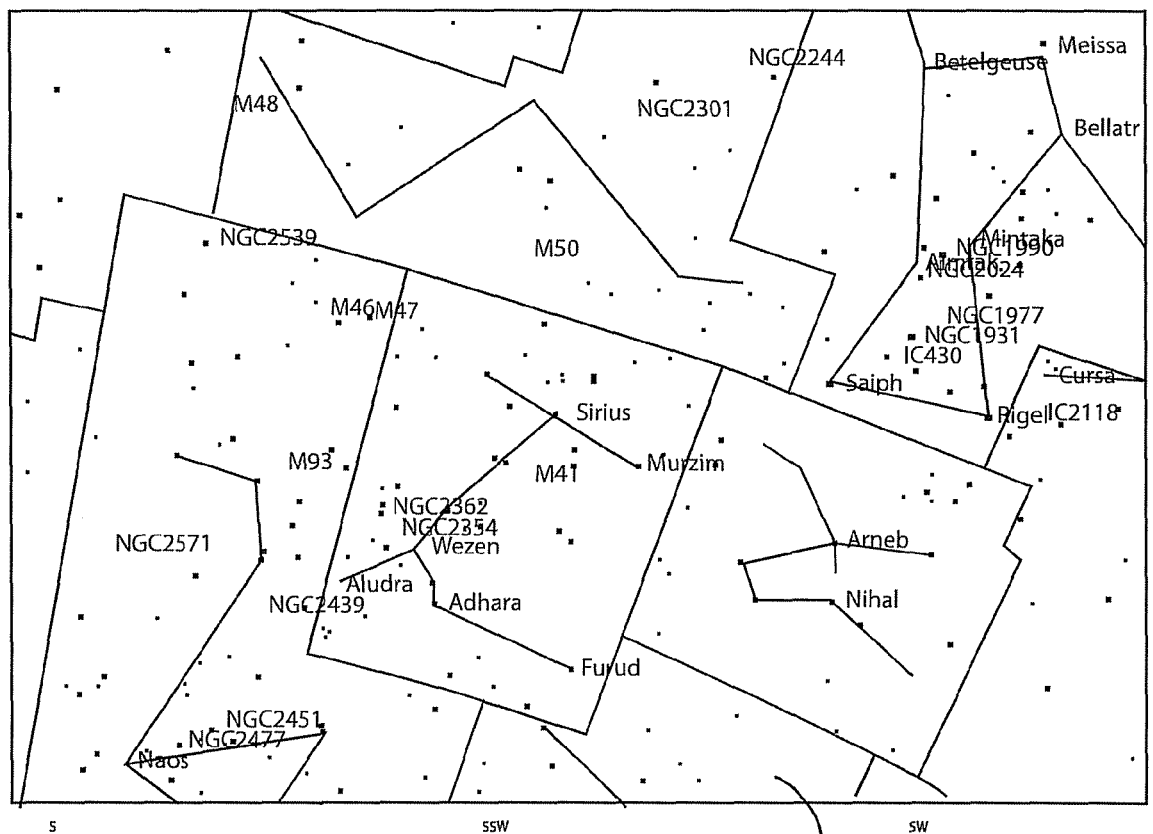
FIG. 7 shows an example of a sky pattern displayed on the display of the FIG. 1 device according to a particular embodiment.

At the conclusion of block 134, controller 50 has determined a number of celestial objects which are proximate to pointing axis 20 for display on display 14. In block 136, controller causes representations of the block 134 celestial objects to be displayed as a sky pattern on display 14. The block 136 sky pattern displayed on display 14 models the view that a user might have on a clear night when looking at the night sky in the direction of pointing axis 20. In addition to graphical representations of celestial objects, the block 136 sky pattern display may comprise other information about celestial objects. By way of non-limiting example, the block 136 display may show the names of certain celestial objects, the names of constellations and/or other information about certain celestial objects (e.g. age of star, type of star, distance between earth and star or the like). An example block 136 sky pattern display screen 14 is shown in FIG. 7.

Once the sky pattern is displayed in block 136, method 110 returns to the block 124 inquiry to ascertain whether the user has elected to lock display 14. A user may lock display 14 using one or more user inputs 16. If the user has not locked display 14 (block 124 NO output), then method 110 loops back to block 112. If the user has locked display 14 (block 124 YES output), then method 110 proceeds to block 138 where controller 50 locks display 14. When display 14 is locked in block 138, then the sky pattern displayed on display 14 remains static and is longer updated. Even though the sky pattern remains static, a user may optionally use device 10 (including display 14) to perform other operations in block 140. A number of types of other operations which may be performed in block 140 are described below.

Figure 8A:
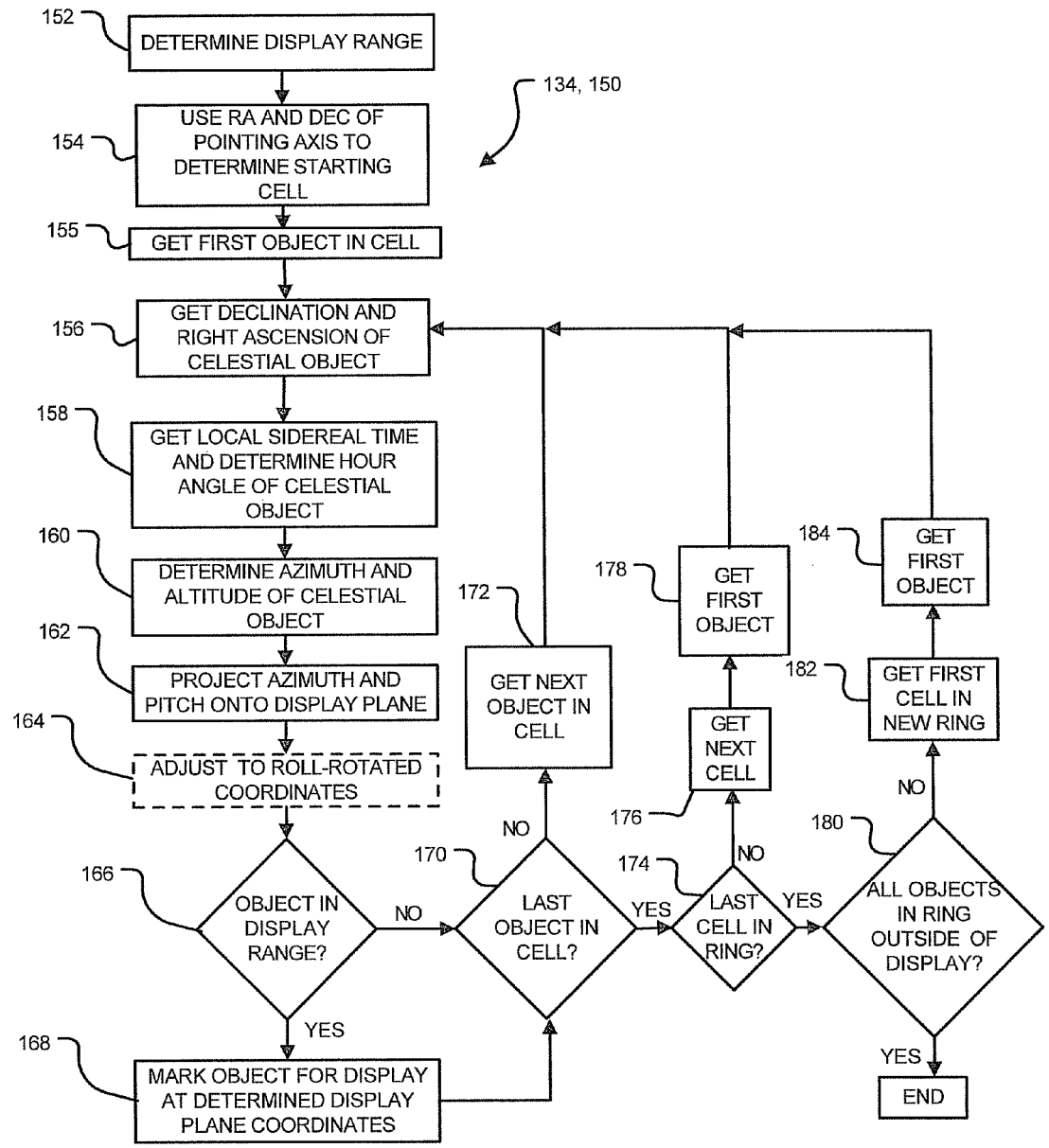
FIG. 8A shows a method for querying a database of celestial objects to determine which objects are sufficiently proximate to the pointing axis of the FIG. 1 device so as to be displayed on its display according to a particular embodiment of the invention.

The block 134 determination of the celestial objects for display is now described in more particular detail. FIG. 8A shows a method 150 for implementing block 134 according to a particular embodiment of the invention. Method 150 may be performed at least in part by controller 50. As discussed above, method 150 (block 134) may involve querying a database of celestial objects to determine which objects are sufficiently proximate to pointing axis 20 so as to be displayed on display 14.

Method 150 is implemented generally by querying a database of celestial objects for objects that are relatively proximate to the direction in which pointing axis 20 is oriented. By way of non-limiting example, the celestial object database may be stored in memory 52 or may be accessible to controller 50 via I/O ports 19. The elements of the celestial object database may comprise records containing information about particular celestial objects, with each record corresponding to a particular celestial object. By way of non-limiting example, the information contained in each record may include the name of the celestial object, its distance from the earth, its age, its size, its type (e.g. type of star) and/or the like. In the particular embodiment described herein, the individual records of the database are indexed by the DEC and RA coordinates of their corresponding celestial objects. Other indexing parameters could be used.

Method 150 commences in block 152 which involves determining the boundaries of the sky pattern to be displayed on display 14. The boundaries of the sky pattern to be displayed may depend on a current zoom level set by the user. In particular embodiments, the user-selected zoom level may be set at one of a plurality of discrete levels. In one particular embodiment, the user may set the current zoom level using rotary user input 16J which may be rotated in one direction to increase the zoom (i.e. to provide a correspondingly smaller sky pattern) and in the opposing direction to decrease the zoom (i.e. to provide a correspondingly larger sky pattern). In other embodiments, other user inputs 16 could be used to provide the current zoom level.

The sky pattern to be displayed may be centered at the direction of pointing axis 20. In one particular embodiment, the sky pattern to be displayed may comprise a rectangular-shaped planar projection of a corresponding portion of the celestial sphere centered at the direction (e.g. azimuth 38A and altitude 42 or corresponding RA and DEC) of pointing axis 20. The projection of the celestial sphere (or portions thereof) onto a plane may be accomplished using a variety of projection techniques known to those skilled in the art. By way of non-limiting example, such projection techniques may include stereographic projection, orthographic projection, azimuthal equal area projection, azimuthal equal distance projection, gnomonic projection or the like. The edges of the rectangular-shaped planar projection may then correspond to the edges of display 14 (i.e. the display boundary). In some embodiments, a pair of edges of the rectangular-shaped display boundary are parallel to the horizon at the location in which device 10 is being used. Such a display boundary may be referred to as a non-roll-rotated display boundary. In other embodiments, the display boundary may be rotated from the horizon by an angle corresponding to roll angle 44. Such a display boundary may be referred to as a roll-rotated display boundary.

Figure 9:
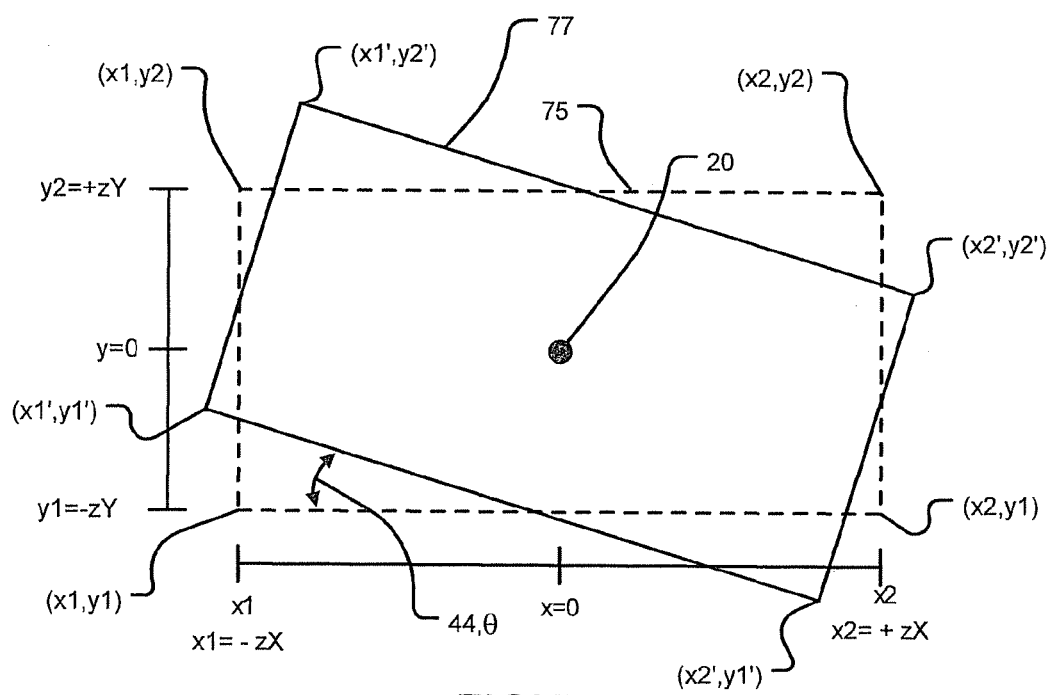
FIG. 9 shows example screen boundaries according to a number of embodiments of the invention.

A non-roll-rotated display boundary 75 determined according to a particular embodiment is shown as a dashed-line rectangle 75 in FIG. 9. Display boundary 75 has corners $(x_1,y_1)$, $(x_1,y_2)$, $(x_2,y_2)$ and $(x_2,y_1)$ and is centered at a location corresponding to the planar projection of the intersection of pointing axis 20 with the celestial sphere. In the FIG. 9 illustration, display boundary 75 has left and right boundaries given by $x_1=-zX$ and $x_2=zX$ where z is a value corresponding to the current zoom level and X is an azimuthal offset value. Similarly, the bottom and top boundaries of display boundary 75 are $y_1=-zY$ and $y_2=zY$, where z is the value corresponding to the current zoom level and Y is a altitude offset value. Method 150 may involve determining which celestial objects in the celestial object database are projected within display boundary 75—i.e. within the rectangle formed by the corners $(x_1,y_1)$, $(x_1,y_2)$, $(x_2,y_2)$ and $(x_2,y_1)$.

In some embodiments, the celestial objects displayed on display 14 take into account roll angle 44 of device 10. This process may be referred to as roll-rotation display compensation. FIG. 9 shows a roll-rotated display boundary 77 in a solid line. Roll-rotated display boundary 77 is rotated by an angle θ relative to display boundary 75, where θ may be equal to or based on roll angle 44. Roll-rotated display boundary 77 has corners $(x_1',y_1')$, $(x_1',y_2')$, $(x_2',y_2')$ and $(x_2',y_1')$ in a roll-rotated coordinate system. In general, where a rotation involves a rotation by an angle θ about the origin, the coordinates $(x',y')$ in the rotated coordinate system of a point $(x,y)$ are related according to the transformation:

$$x'=x \cos\theta + y \sin\theta$$

$$y'=-x \sin\theta + y \cos\theta$$

Such a transformation (where the roll angle 44 is used as the rotational angle θ) may be performed on the corners $(x_1,y_1)$, $(x_1,y_2)$, $(x_2,y_2)$ and $(x_2,y_1)$ of display boundary 75 to obtain the corners $(x_1',y_1')$, $(x_1',y_2')$, $(x_2',y_2')$ and $(x_2', y_2')$ of the roll-rotated display boundary 77 in the roll-rotated coordinate system.

Figure 8B:
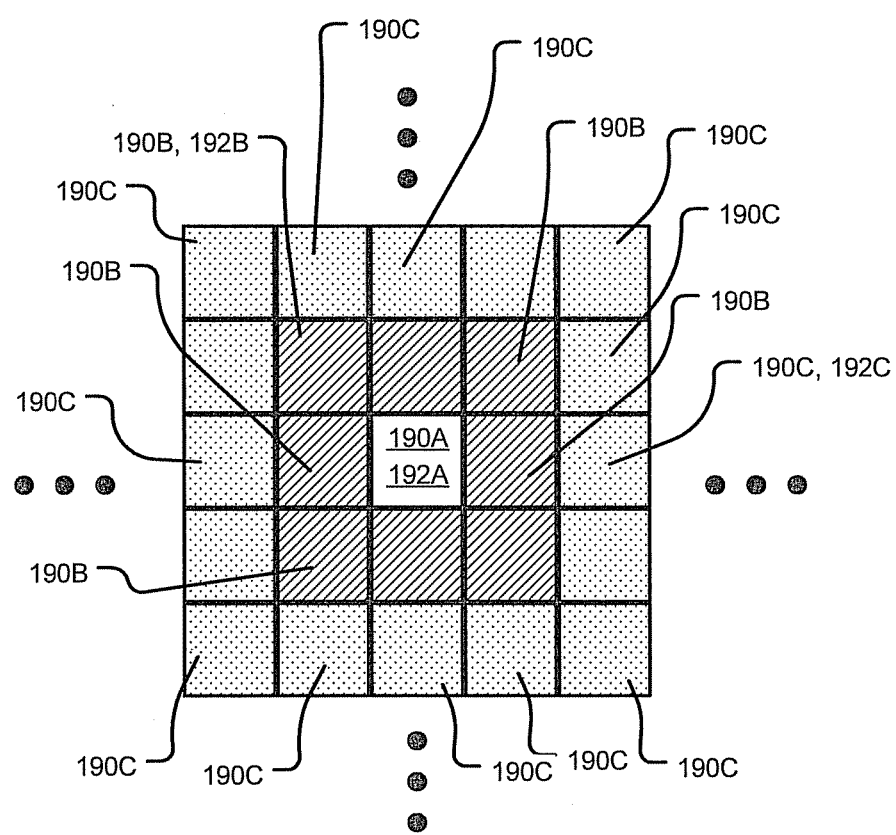
FIG. 8B is a schematic depiction of the cells and rings used in the FIG. 8A database query.

Returning to FIG. 8A, method 150 then proceeds to block 154 which involves determining a starting cell for the method 150 database query. The celestial object database may be divided into cells and rings to reduce the processing required to perform the method 150 query of the celestial object database. A schematic graphical example of a particular technique for selecting cells 190A, 190B, 190C (collectively, cells 190) and rings 192A, 192B, 192C (collectively, rings 192) is shown schematically in FIG. 8B. In the illustrated example of FIG. 8B, the starting ring 192A comprises a single starting cell 190A (shown as white). The second ring 192B (shown with angular stripes) comprises the eight cells 190B surrounding starting ring/cell 192A/190A and the third ring 192C (shown as grey) comprises the sixteen cells 190C surrounding second right 192B. Similar rings 192 comprising an increasing number of cells 190 may be constructed in such a manner as to surround the preceding ring until the search space defined by rings 192 and cells 190 includes the entire database.

The block 154 starting cell 190A may be based on the DEC and RA coordinates of pointing axis 20 determined in blocks 126 and 130 (FIG. 6) which may be referred to as $DEC_0$ and $RA_0$. The block 154 starting cell 190A may be centered at $DEC_0$ and $RA_0$ and may span a declination range of $DEC_0 \pm \Delta_{DEC}$ and a RA range of $RA_0 \pm \Delta_{RA}$. Second and subsequent rings 192B, 192C, 192D . . . may comprise successively larger numbers of cells 190B, 190C, 190D . . . surrounding the block 154 starting cell 190A and the previously searched rings. For example, in the example illustrated in FIG. 8B, second ring 192B may comprise a ring bounded at its interior edge by first cell 190A and at its exterior edge by $DEC_0 \pm 3\Delta_{DEC}$ and $RA_0 \pm 3\Delta_{RA}$, third ring 192C may comprise a ring bounded at its interior edge by second ring 192B and at its exterior edge by $DEC_0 \pm 5\Delta_{DEC}$ and $RA_0 \pm 5\Delta_{RA}$ and the $n^{th}$ ring 192 may comprise a ring bounded at its interior edge by the $(n-1)^{th}$ ring and at its exterior edge by $DEC_0 \pm (2(n-1)+1)\Delta_{DEC}$ and $RA_0 \pm (2(n-1)+1)\Delta_{RA}$. It will be appreciated that the FIG. 8B division of the database into cells 190 and rings 192 represents one particular exemplary embodiment. Cells 190 and rings 192 having other sizes or configurations may be used.

Once the block 154 starting cell 190A is determined, method 150 proceeds to block 155 which involves getting the first database record (corresponding to a first celestial object) from within the starting cell 190A and setting the first database record to be the current database record. Method 150 then advances to block 156, which involves obtaining the DEC and RA coordinates for the current database record (i.e. the current celestial object). In block 158, method 150 uses the LST corresponding to the location in which device 10 is being used (determined in block 128, FIG. 6) to determine the HA of the current database record. As described above, HA is related to LST and RA according to HA=LST−RA. Method 150 then proceeds to block 160 which involves using the block 158 HA and the block 156 DEC of the current database record to determine the azimuth (AZ) and altitude (ALT) coordinates of the corresponding celestial object at the location that device 10 is being used. Methods for conversion between DEC, HA (equatorial coordinates) and AZ, ALT (horizontal coordinates) are well known to those skilled in the art of astronomy.

Method 150 then proceeds to block 162 which, in the illustrated embodiment, involves projecting the block 160 ALT, AZ coordinates of the current database record and the associated celestial object onto the block 152 display boundary plane (e.g. the plane of display boundary 75 (FIG. 9)). As discussed above, there are a number of mathematical techniques for performing this projection, including, without limitation, stereographic projection, orthographic projection, azimuthal equal area projection, azimuthal equal distance projection, gnomonic projection or the like. In some embodiments which incorporate roll-rotation display compensation, method 150 proceeds to optional block 164, where the block 162 projected coordinates are subjected to the above-described roll-rotation transformation so as to express the projected coordinates in the roll-rotated coordinate system of display boundary 77 (FIG. 9).

Method 150 then proceeds to block 166 which involves an inquiry into whether the current database record and the associated celestial object are within the block 152 display boundary (i.e. display boundary 75 in embodiments without roll-rotation display compensation or display boundary 77 in embodiments with roll-rotation display compensation). If the block 166 inquiry is negative (i.e. the celestial object is outside of display boundary 75, 77), then method 150 proceeds directly to block 170. On the other hand, if the block 166 inquiry is positive (i.e. the celestial object is inside display boundary 75, 77), then method 150 proceeds to block 168 where the current database record and the associated celestial object are marked or flagged for subsequent display in block 136 (FIG. 6). From block 168, method 150 advances to block 170.

Block 170 involves an inquiry into whether the current database record is the last database record within the current cell 190. If the block 170 inquiry is negative, method 150 advances to block 172, which involves determining the next database record in the current cell 190 and setting the next database record to be the current database record before looping back to block 156. If the block 170 inquiry is positive, then method 150 proceeds to block 174 which involves an inquiry as to whether the current cell 190 is the last cell 190 in the current ring 192. If the block 174 is inquiry negative, then method 150 advances to block 176 which involves getting the next cell 190 in the current ring 192 and then to block 178 which involves getting the first object/database record in the new cell 190 before looping back to block 156. If the block 174 inquiry is positive, then method 150 proceeds to block 180 which involves an inquiry as to whether all of the objects in the current ring 192 are outside of the block 152 display boundary (i.e. display boundary 75, 77 (FIG. 9)).

If some or all of the objects of the current ring 192 are inside the block 152 display boundary (block 180 NO output), then method 150 advances to block 182. In block 182, method 150 gets the next ring 192 and sets the next ring to be the current ring and also gets the first cell 190 in the new ring 192 and sets this cell to be the current cell. Method 150 then proceeds to block 184 which involves selecting the first object/database record in the new cell and new ring of block 182 and setting the first database record to be the current database record before looping back to block 156.

Method 150 continues looping until it reaches a ring 192 where none of the database records in the ring 192 fall within the display boundary. This condition corresponds to the block 180 YES output. At this point method 150 concludes that there are no other objects to display and ends.

As discussed above, block 136 (FIG. 6) involves displaying a sky pattern on display 14 of device 10. The block 136 sky pattern includes representations of the celestial objects determined in block 134 to be within the display boundary. Such a display is shown, for example, in FIG. 7. As discussed above, the celestial object database records associated with certain celestial objects may contain additional information. By way of non-limiting example, the information contained in each record may include the name of the celestial object, its distance from the earth, its age, its size, its type (e.g. type of star) or the like. If all or even part of this information is displayed simultaneously on display 14, it may obscure or mask the representations of other celestial objects or information about other celestial objects.

As shown in the example display of FIG. 7, this issue is particularly problematic where device 10 is a hand-held device and the size/resolution of display 14 is limited. The FIG. 7 example display contains only the names of a few celestial objects, but the display of these few names obscures or masks the representations of other celestial objects and the names of particular celestial objects obscure the names of other celestial objects. This issue would be compounded if the names of all of the celestial objects visible in the FIG. 7 display were shown simultaneously or if it was desired to display other information about the celestial objects being displayed.

This display overlap issue may be mitigated in some embodiments by using various time splitting display techniques. Such time splitting techniques may be based on the brightness of the displayed celestial objects, on the type of celestial objects and/or on the type of information displayed for example. In one particular example embodiment, a display loop involves: (i) displaying the names of stars having a brightness greater than a first threshold $B_1$ for a time period $t=\Delta_1$; (ii) displaying the names of stars having a brightness greater than a second threshold $B_2$ but less than or equal to the first threshold $B_1$ for a time period $t=\Delta_2$; (iii) displaying the names of stars having a brightness greater than a third threshold $B_1$ but less than or equal to the second threshold $B_2$ for a time period $t=\Delta_3$; (iv) displaying the names of deep space objects (DSOs) having a brightness greater than a first DSO threshold $B_{DSO\_1}$ for a time period $t=\Delta_{DSO\_1}$; (v) displaying the names of DSOs having a brightness less than or equal to the first DSO threshold $B_{DSO\_1}$ for a time period $t=\Delta_{DSO\_2}$; and (vi) looping back to (i). Time splitting techniques based on other criteria (e.g. age of star, alphabetic order of the name of the star or type of information for display) may use similar time splitting periods. In some embodiments, there may be a brief period without any displayed information between successive display or at the conclusion of each iteration of display loop.

The criteria on which display information is time split may be user-selectable. For example, in the above-described example embodiment, display information is time split based on object type (e.g. stars or DSOs) and based on brightness level. In other embodiments, a user may use user inputs 16 to cause display information to be time split based on other criteria, such as the type of star, the age of star, the alphabetic order of the name of the star or the like. In some embodiments, the display of the representations of the celestial objects (in addition to the information about the celestial objects) may also be time split. In some embodiments, the types of information about celestial objects that is displayed may be time split or toggled in response to user input. For example, it may be desirable to display the names of objects during a first time slice and then to display other information (e.g. the distance of the object from the earth) during a next time slice and then to display still other information (e.g. the type of star) during a next time slice etc. The display of different types of information may be layered over a different time splitting sequence. For example, a first loop through the above-described brightness-based time splitting sequence, may involve display of the names of the celestial objects; the second loop through the above-described brightness-based time splitting sequence, may involve display of the distance of the celestial objects from the earth; and the third loop through the above-described brightness-based time splitting sequence, may involve display of the type of star of the celestial objects; and the fourth loop may loop back to the names again. Rather than strict time splitting, any of the above-described display partitioning techniques may run sequentially based on user toggling. For example, in the above-described looping sequence, the time slices $\Delta_1, \Delta_2, \Delta_3, \Delta_{DSO\_1}, \Delta_{DSO\_2}$ may be replaced with user toggling events.

For example a user may toggle between displays of the names of different brightness level stars using one or more of user inputs 16.

Figure 10A:
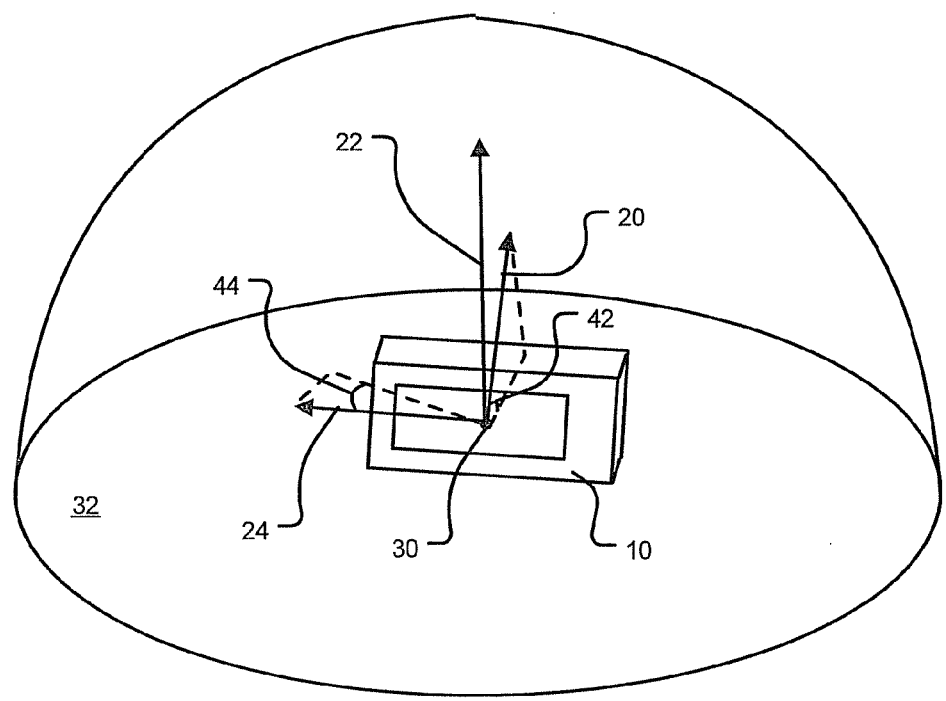
FIGS. 10A and 10B respectively depict use of the FIG. 1 device in normal orientation mode and downward orientation mode.

Optional block 114 of method 110 (FIG. 6) described above involves determination of an orientation mode of device 10. In some embodiments, a user may set device 10 to one of a plurality of orientation modes using one of more of user inputs 16. In one particular embodiment, the plurality of orientation modes include: normal orientation mode, downward orientation mode and auto-switching orientation mode. Use of device 10 in normal orientation mode and in downward orientation mode are shown in FIGS. 10A and 10B respectively.

When device 10 is being used in normal orientation mode (FIG. 10A), pointing axis 20 is generally oriented above horizon 32 (i.e. altitude 42 (FIG. 3) of pointing axis 20 is in a range of [0°, 90°]). Normal orientation mode is advantageous because the sky pattern on display 14 is displayed back to the user with generally the same orientation as the sky itself, so that the user may quickly and easily shift their view between the actual sky and display 14, so as to easily recognize actual celestial objects based on the representations of these celestial objects shown on display 14. Except where specifically stated otherwise, the description set out above assumes that device 10 is operating in normal orientation mode. Use of device 10 in normal orientation mode may not be ideal in all circumstances. When used in normal orientation mode, device 10 can block part of the user's view of the sky. Also, the user's arm(s) can tire from holding device 10 up (e.g. above his or her head) for use in normal orientation mode.

Figure 10B:
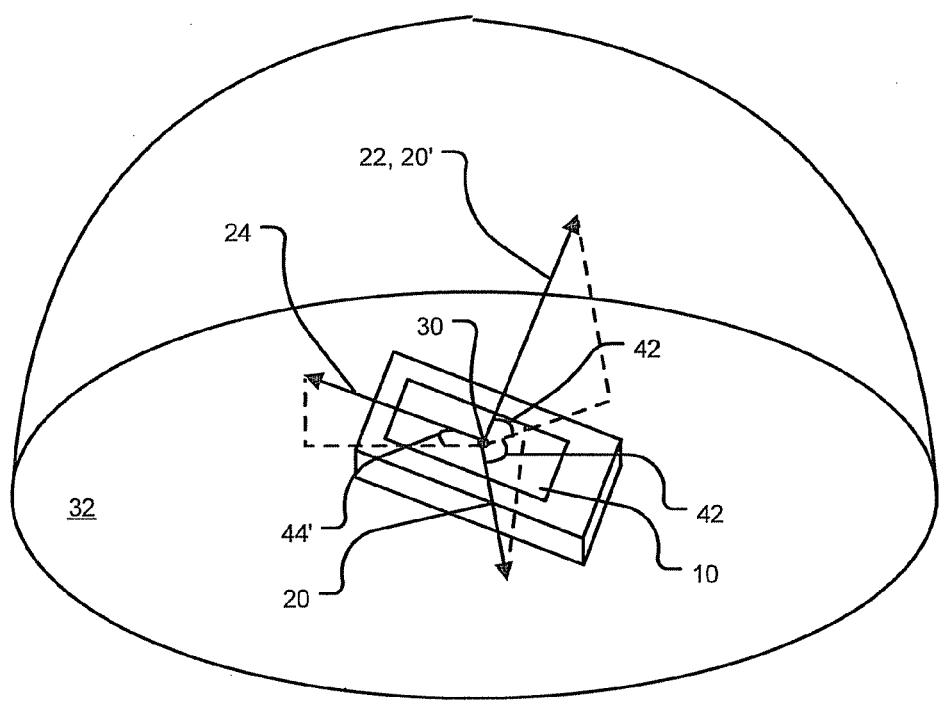

A particular downward orientation mode is shown in FIG. 10B. Downward orientation mode may involve the application of one or more coordinate system rotation transformations about the origin 30. As such, when discussing downward orientation mode, this description refers to the transformed (rotated) axes as "modified" pointing axis 20' and "modified" device-plane axes. In some instances, particularly where used alongside modified pointing axis 20' and modified device-plane axes, this description refers to the non-transformed coordinate system axes 20, 22, 24 as "original" pointing axis 20 and "original" device-plane axes 22, 24. In other instances, however, the word "original" is not expressly used to refer to pointing axis 20 and device plane axes 22, 24, in which case these axes 20, 22, 24 should be understood to be non-transformed axes, unless otherwise specified. When used in downward orientation mode, device 10 may be oriented such that original pointing axis 20 is directed below horizon 32 (i.e. altitude 42 of original pointing axis 20 is in a range of [−90°, 0°]). Even though original pointing axis 20 is below horizon 32 and does not point at celestial objects, it can be desirable in downward orientation mode to display representations of celestial objects on display 14. Consequently, in downward orientation mode, controller 50 may apply a suitable coordinate rotation transformation to the original axes 20, 22, 24 about the origin 30 to obtain a modified coordinate system and, in particular, a modified pointing axis 20'.

In particular embodiments, the coordinate system transformation applied by controller 50 in downward orientation mode comprises a coordinate system rotation of an angle γ about original device-plane axis 24. In the particular case of the illustrated embodiment of FIG. 10B, the angle γ through which the coordinate system is rotated is γ=90°. Where the coordinate system rotation transformation is γ=90° about original device-plane axis 24, the effect is that original pointing axis 20 is rotated such that modified pointing axis 20' has the orientation of original device-plane axis 22. That is, modified pointing axis 20' may be assigned to original device-plane axis 22. From the prospective of configuring controller 50 and from utilization of processing resources, this rotation transformation of γ=90° about original device-plane axis 24 represents a convenient transformation, particularly where attitude sensor 76 comprise individual sensors aligned with original axes 20, 22, 24, since the actual rotation transformation need not be computed and the effect of the rotation transformation may be accomplished by re-assigning the individual sensors of attitude sensor 76 to the modified axes. In particular, the individual attitude sensor originally assigned to original device-plane axis 22 may be assigned by controller 50 to be the modified pointing axis 20' and the sensor assigned to original pointing axis 20 may be assigned to be one of the modified device-plane axes.

With such re-assignments, controller 50 can use the information from attitude sensor 76 to determine a modified altitude 42' (i.e. the angle between modified pointing axis 20' (original device-plane axis 22) and horizon 32) and a modified roll angle 44' (i.e. the angle between original device-plane axis 24 and the intersection of the plane formed by axes 20, 22 and horizon 32). This sensor reassignment facilitates the use of modified pointing axis 20', modified altitude 42' and modified roll 44' without the need to perform actual coordinate transformation calculations. Modified azimuth angle 38A' (not explicitly shown) for downward orientation mode may be defined as the angle between true north 36A (FIG. 3) and the projection of modified pointing axis 20' onto horizon 32.

In general, the coordinate system rotation transformation for operation in downward orientation mode is not limited to the γ=90° rotation about original device-plane axis 24 that is shown in FIG. 10B. In other embodiments, the angle γ of rotation about original device-plane axis 24 may take on other values. In particular embodiments, the angle γ of rotation about original device-plane axis 24 may be set to a value in a range of (0°, 180°]—i.e. 0°<γ≤180°. In some embodiments, rotation γ may be set to a value in a range of [45°, 180°]—i.e. 45°≤γ≤180°. The rotation parameter γ may be user-selectable. In other embodiments, the coordinate system rotation transformations are not limited to rotation about original device-plane axis 24 and may comprise general coordinate system rotations which involve various combinations of rotations about any of the original axes 20, 22, 24.

The rotation of coordinate systems about their origins and the associated rotation transformations are well understood to those skilled in the art. For embodiments which involve generalized (i.e. non 90°) rotations of γ about original device-plane axis 24 or other generalized rotations (e.g. about other axes), the definitions of modified pointing axis 20', modified altitude 42', modified roll angle 44' and modified azimuth 38A' will depend on the particular rotation transformation used. The definitions of these modified parameters will be understood by those skilled in the art. Also, for embodiments which involve generalized (i.e. non 90°) rotations of γ about original device-plane axis 24 or other generalized rotations (e.g. about other axes), some sensed parameters (e.g. signals 70 representing information sensed by magnetic sensor 68 and signals 78 sensed by attitude sensor 76) may be transformed by suitable rotation transformation or other suitable processing techniques, such that the information from such sensors is applicable to the modified coordinate system and provides information relative to modified pointing axis 20', modified altitude 42', modified roll angle 44' and modified azimuth 38A'.

Even though original pointing axis 20 is oriented below horizon 32 in downward orientation mode, a suitable coordinate transformation (e.g. a suitable value of γ for rotation about original device-plane axis 24) may be selected such that modified altitude 42' of modified pointing axis 20' may generally be in a range of [0°, 90°]. The method 110 operation of device 10 in downward orientation mode may be similar to that described above for normal orientation mode, except that in block 114 controller 50 determines that device 10 is operating in downward orientation mode. After this block 114 determination, controller 50 may perform transformations (as necessary) for substitution of modified pointing axis 20', modified altitude 42', modified roll angle 44' and modified azimuth 38A' respectively for pointing axis 20, altitude 42, roll angle 44 and azimuth 38A in the above-described operations of method 110. In some embodiments, the order of method 100 blocks 112, 114 may be reversed.

Operation of device 10 in downward orientation mode has a number of advantages. For example, downward orientation mode overcomes the issues associated with device 10 blocking a portion of the user's view of the sky and with arm fatigue associated with holding device 10. Downward orientation mode also makes it easy for a user to read or write on a horizontal surface while viewing display 14.

A user may toggle between normal orientation mode and downward orientation mode using one or more user inputs 16. In addition to normal orientation mode and downward orientation mode, a user may set device 10 to auto-switching orientation mode using one or more user inputs 16. In auto-switching mode, controller 50 may determine the altitude 42 (i.e. the angle between original pointing axis 20 and horizon 32) and may automatically set device 10 to one of normal orientation mode or downward orientation mode depending on the current value of altitude 42.

Figure 11:
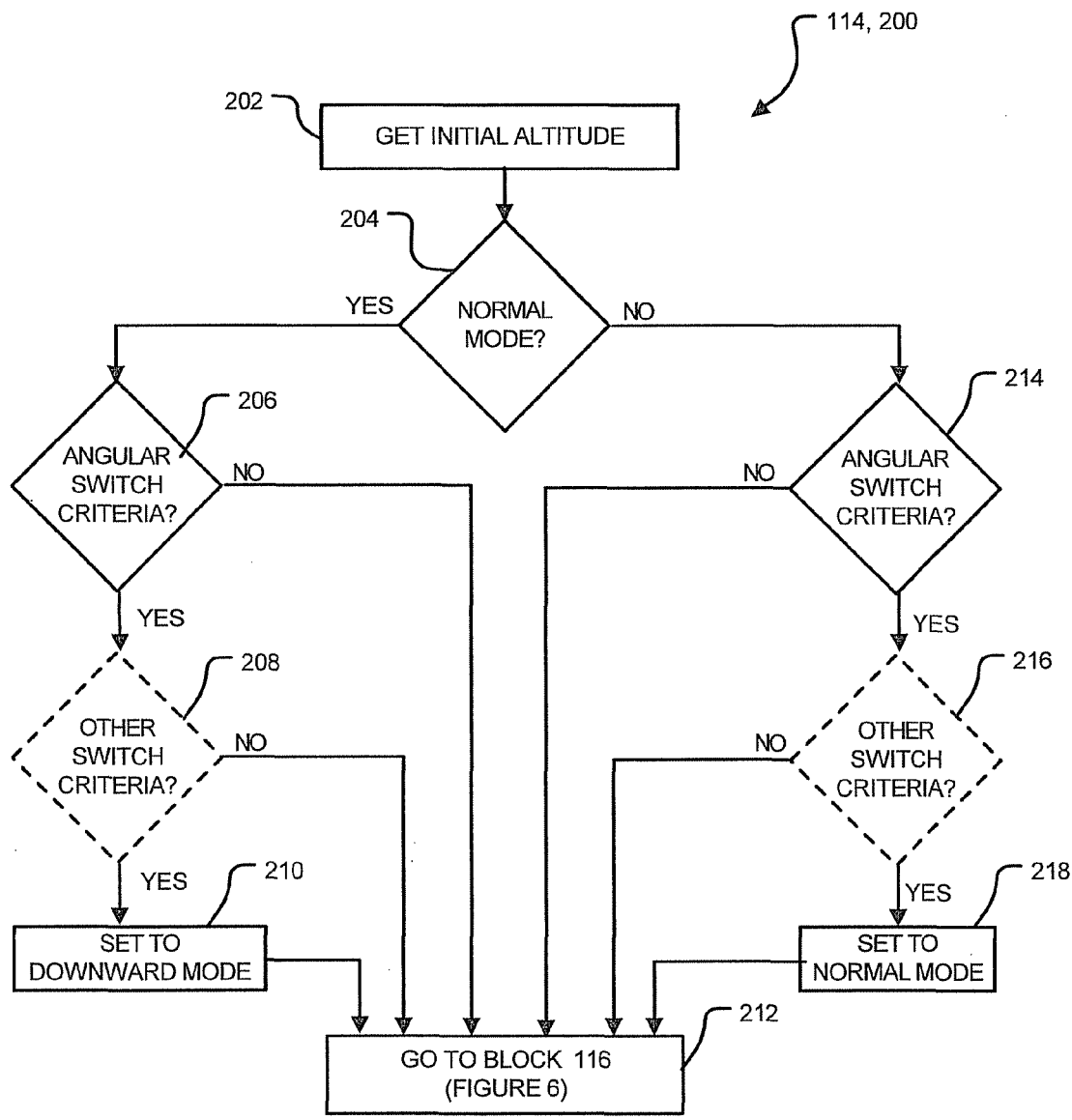
FIG. 11 depicts a method for implementing an auto-switching orientation mode according to a particular embodiment.

FIG. 11 depicts a method 200 for implementing an auto-switching orientation mode in block 114 according to a particular embodiment. Method 200 may be performed at least in part by controller 50. Method 200 starts in block 202 which involves obtaining an initial altitude angle 42 (i.e. the angle between original pointing axis 20 and horizon 32). As discussed above, controller 50 may determine initial altitude angle 42 based on attitude signals 78 from attitude sensor 76. Block 204 involves an inquiry as to whether device 10 is currently operating in normal orientation mode. If the block 204 inquiry is positive, method 200 branches to block 206, which involve evaluation of one or more angular switch criteria. In one particular embodiment, the block 206 angular switch criteria comprises an inquiry into whether the block 202 initial altitude 42 is less than an angular threshold. The block 206 angular threshold may be 0° or may be less than 0°, but may be relatively close to 0°. For example, the block 206 angular threshold may be in a range of [−5°,−20°] and the block 206 angular switch criteria may comprise an evaluation of whether the block 202 initial altitude 42 is less than this angular threshold. If the block 206 inquiry is negative, then method 200 proceeds to block 212 where it remains in 25 normal orientation mode and branches to block 116 (FIG. 6) for the remainder of method 110.

If the block 206 inquiry is positive, then method 200 advances to optional block 208 which involves an inquiry into whether there are other switch criteria to be satisfied. By way of non-limiting example, the block 208 other switch criteria may involve temporal criteria (e.g. the block 202 initial altitude angle 42 must remain below the block 206 threshold for a sufficient period of time). Such temporal criteria could prevent accidental or otherwise undesired switching between orientation modes. The block 208 switching criteria may involve other criteria, such as a user prompt, or some other criteria for preventing undesired switching between orientation modes. If the block 208 inquiry is negative, then method 200 proceeds to block 212 where it remains in normal orientation mode and branches to block 116 (FIG. 6) for the remainder of method 110.

If the block 208 inquiry is positive (or if optional block 206 is not present), then method 200 advances to block 210, where controller 50 changes the orientation mode of device 10 from normal orientation mode to downward orientation mode. Once the orientation mode is changed to downward orientation mode in block 210, method 200 proceeds to block 212 and branches back to block 116 (FIG. 6) in downward orientation mode (i.e. with modified pointing axis 20', modified altitude 42', modified roll angle 44' and modified azimuth 38A', as required) for the remainder of method 110.

If the block 204 inquiry is negative (i.e. device 10 is initially in downward orientation mode), then method 200 branches to block 214. Block 214 involves evaluation of angular switch criteria similar to that of block 206, except that the block 214 angular switch criteria may comprise an inquiry as to whether the block 202 initial altitude 42 is greater than an angular threshold which may be 0° or relatively close to zero (e.g. in a range of [−10°,10°]). In currently preferred embodiments, the block 214 angular switch criteria is less than 0°, but is closer to 0° than the block 206 angular switch criteria. For example, the block 206 inquiry may be positive if the block 202 altitude 42 is less than or equal to −15° and the block 214 inquiry may be positive if the block 202 altitude 42 is greater than −5°. If the block 214 inquiry is negative, then method 200 branches to block 212 and back to block 116 (FIG. 6) in downward orientation for the remainder of method 110. Optional block 216 involves evaluation of other switch criteria and which may be similar to those of block 208 and which may be designed to prevent undesired switching of between orientation modes. If the block 216 inquiry is negative, then method 200 branches to block 212 and back to block 116 (FIG. 6) in downward orientation for the remainder of method 110. If, however, the block 216 inquiry is positive, then method 200 advances to block 218 which involves switching to normal orientation mode, before proceeding to block 212 and back to block 116.

As described above in block 140 of method 110 (FIG. 6), device 10 can perform other operations. One non-limiting example of another operation that may be performed by device 10 is to provide additional information about celestial objects. As discussed above, the names of celestial objects may be displayed on display 14 as a part of, or in addition to, the block 136 sky pattern. If a user is interested in obtaining more information about a particular celestial object, then the user may use one or more user inputs 16 to select that particular celestial object and device 10 may output more information (including possibly audio or graphical content) about that particular celestial object.

Device 10 may provide a number of ways in which the user may use user inputs 16 to select a particular celestial object for which to display more information. If the user knows the name of a particular celestial object (e.g. because it was displayed in the block 136 sky pattern or because the user is otherwise interested in a particular celestial object for which the name is known), then the user can use user inputs 16 to scroll through a user interface (e.g. a menu-driven, list-based used interface) to select the particular celestial object from a menu. Such menus may be indexed by object name (e.g. in alphabetical order) or by any other suitable parameter (e.g. age of object, type of object, RA and DEC coordinates or the like). Selecting the particular celestial object in this manner may or may not involve locking the display (block 138).

As another way of selecting a particular celestial object, a user may lock the display (block 138) and may then use one or more user inputs 16 to move a graphical indicator (e.g. a cursor or the like) on display 14. For example, the user may use inputs 16A, 16C, 16E, 16G (FIG. 1) to move a graphical indicator on the sky pattern displayed and locked on display 14 until the graphical indicator is positioned over the desired celestial object and may then select the desired celestial object using user input 16I. Other combinations of user inputs 16 may be used to move a graphical indicator on, and to select a celestial object from, display 14.

When a user moves a graphical indicator over a representation of the desired celestial object, then controller 50 may select the desired celestial object from the celestial object database in a number of ways. For example, controller 50 may select the desired celestial object based on comparing the (x,y) coordinates of a cursor (e.g. within screen boundary 75 (FIG. 9) of display 14) or the (x',y') coordinates of a cursor (e.g. within the roll-rotated screen boundary 77 (FIG. 9) of display 14) to the corresponding (x,y) or (x',y') coordinates of the displayed database records and their corresponding celestial objects and selecting the database record whose coordinates most closely match those of the cursor. As another example, controller 50 may project the screen location of a cursor onto the celestial sphere and then may calculate the RA and DEC of the cursor and compare it to the RA and DEC of various database records to determine the closest database record. Either of these methods may involve searching only a list of celestial objects that are currently displayed on display 14 (e.g. a list of objects marked for display in block 168 (FIG. 8A)), rather than the entire celestial object database.

Another operation that may be performed by device 10 involves guiding a user to a particular celestial object. For example, a user may not know where to locate a particular celestial object in the night sky. If the user knows the name of the celestial object, then the user can select the celestial object using the above-described menu-based object selection system. Once the particular celestial object is selected, the device can enter an operation mode similar to method 110 described above, except that controller 50 can also output one or more indicators (e.g. graphical or audio indicators) which guide the user to change the direction of pointing axis 20 until pointing axis 20 is directed relatively close to the direction of the selected celestial object. The operation of device 10 in such a mode may be similar to that shown in method 110, except that an additional block may be added (e.g. after displaying the sky pattern in block 136 and before block 124) and the additional block may involve comparing the coordinates of pointing axis 20 (e.g. altitude 42 and azimuth 38A) to corresponding coordinates of the selected celestial object and outputting (or refreshing) one or more corresponding directional indicator(s) which direct the user to move device 10 to reduce the difference between the coordinates of pointing axis 20 and the corresponding coordinates of the selected celestial object.

Figure 12:
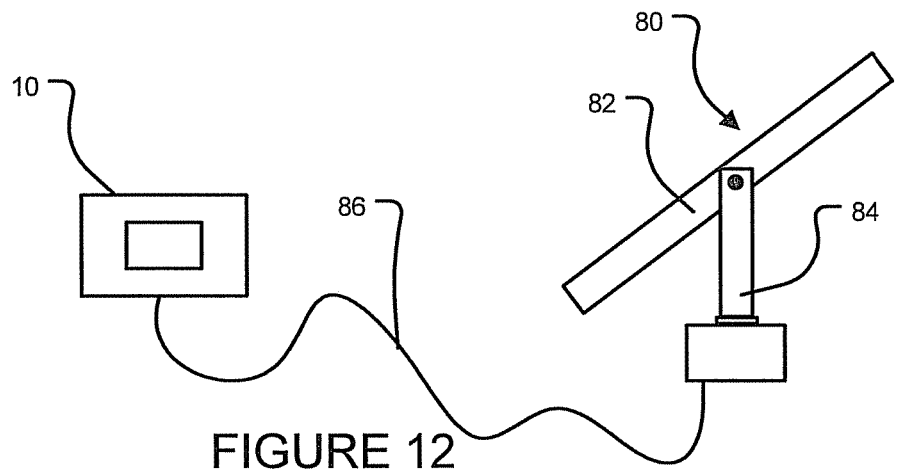
FIG. 12 shows the FIG. 1 device being used to control a motorized telescope system.

Another operation that may be performed by device 10 involves controlling the operation of a motorized telescope. This operational mode is shown schematically in FIG. 12, where device 10 controls the operation of motorized telescope system 80. Motorized telescope system may comprise a telescope 82 and a motorized mount 84. In the illustrated embodiment, mount 84 is an altitude, azimuthal (ALT, AZ) mount, but telescope system 80 may comprise other types of telescope mounts as are known in the art. Motorized telescope system 80 may be of the type (referred to as a GOTO and/or AUTOTRACKING telescope system) which may go to and/or track desired celestial objects or, more particularly, which may go to and/or track desired celestial coordinates. Device 10 is operatively connected to telescope system 80 using a communications link 86. In the illustrated embodiment, communications link is shown as incorporating one or more wires, but this is not necessary and communications link 86 may be implemented wirelessly. Communications link 86 may connect to device 10 via I/O port(s) 19.

Figure 13:
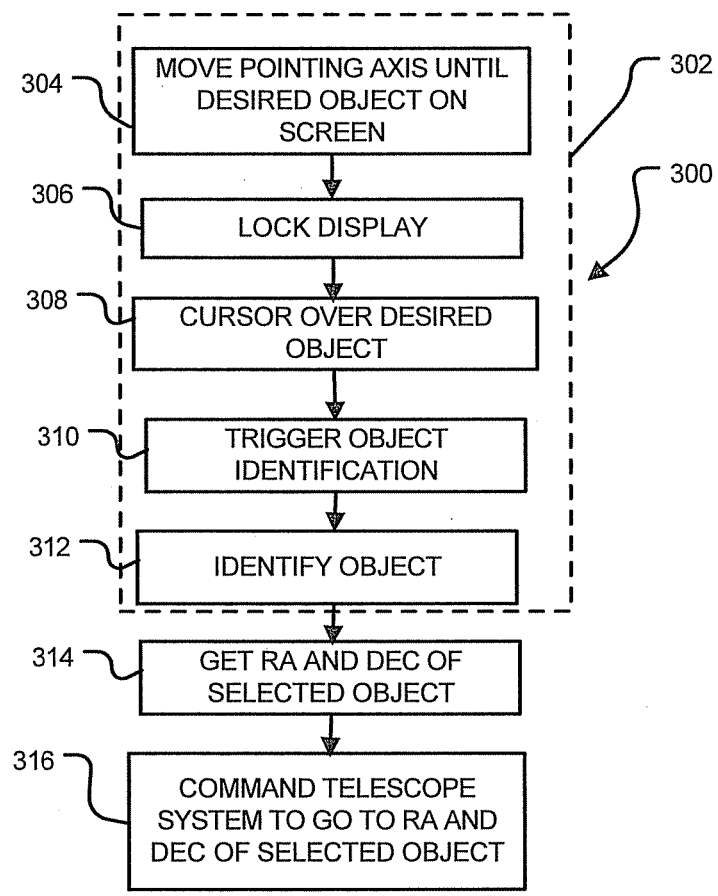
FIG. 13 shows a method for using the FIG. 1 device to control the operation of the FIG. 12 telescope system according to a particular embodiment.

FIG. 13 shows a method 300 for using device 10 to control the operation of telescope system 80 according to a particular embodiment. Method 300 begins in block 302 which involves selection of a particular celestial object from within the celestial object database. The celestial object database may be resident on device 10, resident in telescope system 80 or on an external device (not shown) that is accessible to device 10. In the illustrated embodiment of FIG. 13, block 302 is implemented using a cursor-based object selection technique, but other object selection techniques (e.g. menu driven object selection or the like) may be used in addition to or as alternatives to the illustrated cursor-based technique.

In the illustrated embodiment, object selection 302 commences in block 304 which involves manipulating device 10 (and pointing axis 20) until a representation of a desired celestial object is shown on display 14. This may be done in accordance with method 110 (FIG. 6) described above. When a representation of the desired celestial object is shown in display 14, the user locks the display in block 306. Block 306 may be similar to the locking procedure of block 138 (FIG. 6). In block 308, the user uses one or more user inputs 16 to move a graphical indicator (e.g. a cursor) over the desired celestial object and then uses one or more user inputs 16 to trigger object identification in block 310.

In block 312, controller 50 identifies the user-selected celestial object from within the celestial object database. As alluded to above, the block 312 identification procedure may be performed in a number of ways. For example, controller 50 may select the desired celestial object based on comparing the (x,y) coordinates of the cursor when triggered (e.g. the (x,y) coordinates within screen boundary 75 (FIG. 9) of display 14) or the (x',y') coordinates of the cursor when triggered (e.g. the (x',y') coordinates within the roll-rotated screen boundary 77 (FIG. 9) of display 14) with the corresponding (x,y) or (x',y') coordinates of the displayed database records and their corresponding celestial objects. Controller 50 may then identify the database record whose (x,y) or (x',y') coordinates most closely match those of the cursor. As another example, controller 50 may project the screen location of the cursor when triggered onto the celestial sphere and then may calculate the RA and DEC of the cursor and compare it to the RA and DEC of various database records to determine the closest database record. Either of these block 312 procedures may involve searching only a list of celestial objects that are currently displayed on display 14 (e.g. a list of objects marked for display in block 168 (FIG. 8A)), rather than the entire celestial object database.

Once the desired object is identified in block 312, the block 302 object-selection procedure is complete and method 300 proceeds to block 314 which involves looking up the selected celestial object in the celestial object database to obtain its RA and DEC coordinates. In block 316, the block 314 RA and DEC coordinates of the selected object are communicated to telescope system 80 so that telescope system 80 can track these coordinates. Block 316 may involve providing other information to telescope system 80 (e.g. geographical coordinates (e.g. latitude and longitude) of the location which device 10 is being used, the local time, time zone and date, the local sidereal time or the like).

Certain implementations of the invention comprise computer processors which execute software instructions which cause the processors to perform a method of the invention. For example, one or more processors in device 10 may implement data processing steps in the methods described herein by executing software instructions retrieved from a program memory accessible to the processors. The invention may also be provided in the form of a program product. The program product may comprise any medium which carries a set of computer-readable instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs and DVDs, electronic data storage media including ROMs, flash RAM, or the like. The instructions may be present on the program product in encrypted and/or compressed formats.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- Method 150 (FIG. 8A) involves a system of determining whether to display a particular celestial object by converting the location independent equatorial celestial coordinates (RA, DEC) of the object to location dependent horizontal coordinates (ALT, AZ) and then projecting the horizontal coordinates onto a planar surface representing display 14 to determine whether the object is located within the display boundary 75, 77. In other embodiments, the display boundary 75, 77 may be projected onto the celestial sphere for comparison to the celestial objects in, location dependent horizontal coordinates (ALT, AZ), location dependent equatorial coordinates (DEC, HA) or location-independent equatorial coordinates (DEC, RA).
- In the embodiments described above, controller 50 makes use of altitude angle 42 and roll angle 44 (as determined using information from attitude sensor 76) together with information from magnetic sensor 68 to determine azimuth angle 38A. In some embodiments, this is not necessary and controller may determine a sufficient approximation of azimuth angle 38A based only on information from magnetic sensor 68.
- In some embodiments, it is not necessary to account for roll angle 44—i.e. device 10 can make use of altitude angle 42 (determined from attitude sensor 76) and azimuth angle 38A (determined from magnetic sensor 68 and optionally from altitude angle 42) and can function sufficiently accurately without use of roll angle 44.
- In some embodiments, roll angle 44 is used for the purpose of determining azimuth angle 38A (e.g. in block 120 (FIG. 6)), but is not used for the purposes of displaying the sky pattern (e.g. in block 136 (FIG. 6)). This situation corresponds to the non-roll compensated screen area boundary 75 shown in dashed outline in FIG. 9.
- Some of the above-described embodiments involve time splitting of information that is displayed on display 14.

In such embodiments, controller 50 may repetitively cycle through the different display information for each time slice. In other embodiments, the splitting of information need not be based strictly on time. For example, in some embodiments, information for display may be divided into a number of display slices and a user may cycle (i.e. toggle) through the display slices via one or more user inputs 16. The division of information into such display slices may be based on any of the same criteria described above for time slices. Controller 50 may also be configured to pause the repetitive cycling through time/display slices in response to one or more user inputs 16.

The time/display slices described herein and the display of portions of information and/or information about subsets of displayed objects may be used with other celestial object display devices and may provide methods of operating such devices. By way of non-limiting example, such time slices could be used in conjunction with personal computer-based planetarium software to avoid clutter on the on-screen display.

When the display on screen 10 is paused (e.g. block 138 of method 110 (FIG. 6)), a user may cause controller 50 to alter the on-screen display (e.g. using user inputs 16). By way of non-limiting example, a user may use user inputs 16A, 16C, 16E, 16G to cause controller 50 to cause the display on screen 10 to pan (e.g. left, up, down and/or right). As another non-limiting example, a user may use user input 16J to cause controller 50 to cause the display on screen 10 to zoom (e.g. in or out), except that zoom may be done without waiting to pause the display on screen 10. It will be appreciated that such pan and/or zoom operations may involve changing the coordinates corresponding to display boundary 75, 77 (FIG. 9).

Accordingly, the scope of the invention is to be construed in accordance with the substance defined by the following claims.

What is claimed is:

1. A hand-held device for displaying a sky pattern comprising graphical representations of one or more celestial objects, the device comprising:
    a sensing system comprising one or more sensors for providing information about an orientation of the device;
    a controller configured to:
        receive the orientation information from the sensing system and to determine therefrom an altitude angle of a pointing axis and an azimuthal angle of the pointing axis;
        access a database of celestial objects and determine, from within the database, one or more selected celestial objects for display based at least in part on a measure of proximity of the celestial objects to the pointing axis; and
    a display screen for displaying graphical representations of the one or more selected celestial objects;
    the controller configurable to operate in:
        a normal orientation mode; and
        a downward facing orientation mode, where the controller is configured to receive the orientation information from the sensing system and to determine therefrom a modified altitude angle of a modified pointing axis and a modified azimuthal angle of the modified pointing axis and to use the modified pointing axis in place of the pointing axis for determining the one or more selected celestial objects for display;
    wherein the controller is configured to determine the modified altitude and azimuthal angles of the modified pointing axis by performing a coordinate system rotation transformation on the pointing axis, the coordinate system rotation transformation based on the orientation information from the sensing system.

2. A device according to claim 1 wherein the coordinate system rotation transformation comprises a rotation of an angle γ about a device-plane axis, the device-plane axis orthogonal to the pointing axis.

3. A device according to claim 2 wherein the rotation angle γ is 90°.

4. A device according to claim 2 wherein the rotation angle γ has a user-selectable value in a range of $0°<γ≤180°$.

5. A device according to claim 1 wherein the controller is user configurable between the downward facing orientation mode and the normal orientation mode.

6. A device according to claim 1 wherein the controller is configured to automatically switch between the downward facing orientation mode and the normal orientation mode based at least in part on the altitude angle of the pointing axis.

7. A device according to claim 6 wherein the controller is configured to:
    automatically switch from the normal operational mode to the downward facing operational mode based at least in part on a determination that the altitude angle of the pointing axis is less than a first angular threshold, the first angular threshold less than zero; and
    automatically switch from the downward facing operational mode to the normal operational mode based at least in part on a determination that the altitude angle of the pointing axis is greater than a second angular threshold, the second angular threshold greater than or equal to the first angular threshold.

8. A device according to claim 7 wherein the controller is configured to:
    automatically switch from the normal operational mode to the downward facing operational mode based at least in part on a determination that the altitude angle of the pointing axis is less than the first angular threshold for a time greater than a first temporal period;
    automatically switch from the downward facing operational mode to the normal operational mode based at least in part on a determination that the altitude angle of the pointing axis is greater than the second angular threshold for a time greater than a second temporal period.

9. A device according to claim 1 wherein the modified pointing axis comprises a device plane axis orthogonal to the pointing axis.

10. A device according to claim 1 wherein the database of celestial objects contains additional information in respect of at least some celestial objects and wherein the controller is configured to display at least some of the additional information on the display screen for the one or more selected celestial objects over a plurality of display slices and, in each display slice, to display at least one of: the at least some of the additional information for a subset of the one or more selected celestial objects; and a portion of the at least some of the additional information for the one or more selected celestial objects.

11. A device according to claim 1 wherein the controller is configured to:
    repeat the process of receiving the orientation information, determining therefrom the altitude angle and azimuthal angle and accessing the database to determine one or more selected celestial objects for display, to thereby update the sky pattern displayed on the display screen based on the orientation of the device; and pause the updating of the sky pattern displayed on the display screen in response to user input, so that the sky pattern displayed on the display screen remains static.

12. A device according to claim 11 wherein the controller is configured to display a user-controllable graphical indicator on the display screen when the updating of the sky pattern displayed on the display screen is paused and to allow a user to select a particular celestial object based on the user moving the graphical indicator on the display screen to a vicinity of the graphical representation of the particular celestial object.

13. A device according to claim 12 wherein, upon selection of the particular celestial object, the controller is configured to perform at least one of: outputting information about the particular celestial object to the user; and controlling a motorized telescope to move in a manner such that the particular celestial object comes within its field of view.

14. A device according to claim 1 comprising a proximity sensor for detecting a presence of a user in proximity to the device and for activating the display in response to detecting of the presence of a user in proximity to the device.

15. A device according to claim 11 wherein, when the updating of the sky pattern is paused, the controller is configured to at least one of:
 effect panning of the sky pattern displayed on the display screen in response to user input; and
 effect zooming in or zooming out of the sky pattern displayed on the display screen in response to user input.

16. A hand-held device for displaying a sky pattern comprising graphical representations of one or more celestial objects and additional information in respect of the celestial objects on a limited-size display screen, the device comprising:
 a controller configured to:
  access a database of celestial objects comprising data corresponding to graphical representations of the celestial objects and additional information in respect of at least some of the celestial objects; and
  select one or more selected celestial objects from within the database for display;
 a display screen for displaying graphical representations of the one or more selected celestial objects and at least some of the additional information for the one or more selected celestial objects;
 wherein the controller is configured to display the at least some of the additional information on the display screen over a plurality of display slices and, in each display slice, to display at least one of: the at least some of the additional information for a corresponding subset of the one or more selected celestial objects, the corresponding subset different for each display slice; and a corresponding portion of the at least some of the additional information for the one or more selected celestial objects, the corresponding portion different for each display slice;
 wherein the controller is configured to display the at least some of the additional information on the display screen over the plurality of display slices by successively displaying each of the plurality of display slices for a period of time to thereby serially display the plurality of display slices over time;
 the device further comprising:
 a sensing system comprising one or more sensors for providing information about an orientation of the device and wherein the controller is configured to:
  receive the orientation information from the sensing system and to determine therefrom an altitude angle of a pointing axis and an azimuthal angle of the pointing axis;
  access the database and determine, from within the database, the one or more selected celestial objects for display based at least in part on a measure of proximity of the celestial objects to the pointing axis; and
 wherein the controller is configurable to operate in:
  a normal orientation mode; and
  a downward facing orientation mode, where the controller is configured to receive the orientation information from the sensing system and to determine therefrom a modified altitude angle of a modified pointing axis and a modified azimuthal angle of the modified pointing axis and to use the modified pointing axis in place of the pointing axis for determining the one or more selected celestial objects for display;
  wherein the modified pointing axis is related to the pointing axis via a coordinate system rotation transformation.

17. A device according to claim 16 wherein the controller is configured to repeat the process of receiving the orientation information, determining therefrom the altitude angle and azimuthal angle and accessing the database to determine the one or more selected celestial objects for display, to thereby update the sky pattern displayed on the display screen based on the orientation of the device.

18. A device according to claim 16 wherein the controller is configured to display, in each time slice, the at least some of the additional information for a subset of the one or more selected celestial objects and to determine inclusion of the one or more selected celestial objects in a particular subset based on one or more of: types of celestial objects; distances of celestial objects from earth; ages of celestial objects; alphabetic order of names of celestial objects; and brightness levels of celestial objects.

19. A device according to claim 17 wherein the controller is configured to repetitively cycle through the plurality of display slices based on one or more of: a display time period associated with each display slice; and receiving user toggle inputs which cause the controller to advance to a next display slice.

20. A device according to claim 19 wherein the controller is configured to pause the repetitive cycle through the plurality of display slices in response to user input.

21. A device according to claim 19 wherein the controller is configured, in at least one of the plurality of display slices, to display the graphical representations of the one or more selected celestial objects without any of the additional information.

22. A device according to claim 17 wherein the controller is configured to pause the updating of the sky pattern displayed on the display screen in response to user input, so that the sky pattern displayed on the display screen remains static.

23. A device according to claim 22 the controller is configured to display a user-controllable graphical indicator on the display screen when the updating of the sky pattern displayed on the display screen is paused and to allow a user to select a particular celestial object based on the user moving the graphical indicator on the display screen to a vicinity of the graphical representation of the particular celestial object.

24. A device according to claim 23 wherein, upon selection of the particular celestial object, the controller is configured to perform at least one of: outputting information about the particular celestial object to the user; and controlling a motorized telescope to move in a manner such that the particular celestial object comes within its field of view.

25. A device according to claim 22 wherein, when the updating of the sky pattern is paused, the controller is configured to at least one of:

effect panning of the sky pattern displayed on the display screen in response to user input; and effect zooming in or zooming out of the sky pattern displayed on the display screen in response to user input.

26. A device according to claim 16 comprising a proximity sensor for detecting a presence of a user in proximity to the device and for activating the display in response to detecting of the presence of a user in proximity to the device.

27. A device according to claim 16 wherein the controller is user configurable between the downward facing orientation mode and the normal orientation mode.

28. A device according to claim 16 wherein the controller is configured to automatically switch between the downward facing orientation mode and the normal orientation mode based at least in part on the altitude angle of the pointing axis.

29. A device according to claim 28 wherein the controller is configured to:
automatically switch from the normal operational mode to the downward facing operational mode based at least in part on a determination that the altitude angle of the pointing axis is less than a first angular threshold, the first angular threshold less than zero; and
automatically switch from the downward facing operational mode to the normal operational mode based at least in part on a determination that the altitude angle of the pointing axis is greater than a second angular threshold, the second angular threshold greater than or equal to the first angular threshold.

30. A device according to claim 29 wherein the controller is configured to:
automatically switch from the normal operational mode to the downward facing operational mode based at least in part on a determination that the altitude angle of the pointing axis is less than the first angular threshold for a time greater than a first temporal period;
automatically switch from the downward facing operational mode to the normal operational mode based at least in part on a determination that the altitude angle of the pointing axis is greater than the second angular threshold for a time greater than a second temporal period.

31. A method for displaying a sky pattern comprising graphical representations of one or more celestial objects on a display screen of a hand-held device, the method comprising:
providing the device with one or more sensors for sensing information about an orientation of the device;
determining an altitude angle of a pointing axis of the device and an azimuthal angle of the pointing axis based at least in part on the sensed orientation information;
accessing a database of celestial objects and determining, from within the database, one or more selected celestial objects for display based at least in part on a measure of proximity of the celestial objects to the pointing axis;
displaying graphical representations of the one or more selected celestial objects on the display screen; and
operating the device in one of:
a normal orientation mode; and
a downward facing orientation mode, which comprises determining a modified altitude angle of a modified pointing axis and a modified azimuthal angle of the modified pointing axis based at least in part on the sensed orientation information and substituting the modified pointing axis in place of the pointing axis for determining the one or more selected celestial objects for display;
wherein determining the modified altitude and azimuthal angles of the modified pointing axis comprises performing a coordinate system rotation transformation on the pointing axis, the coordinate system rotation transformation based on sensed orientation information from the one or more sensors.

32. A method according to claim 31 wherein the coordinate system rotation transformation comprises a rotation of an angle $\gamma$ about a device-plane axis, the device-plane axis orthogonal to the pointing axis.

33. A method according to claim 32 wherein the rotation angle $\gamma$ is 90°.

34. A method according to claim 32 wherein the rotation angle $\gamma$ has a user-selectable value in a range of $0° < \gamma \leq 180°$.

35. A method according to claim 31 comprising operating in the downward facing orientation mode or the normal orientation mode based on user input.

36. A method according to claim 31 comprising automatically switching between the downward facing orientation mode and the normal orientation mode based at least in part on the altitude angle of the pointing axis.

37. A method according to claim 36 comprising:
automatically switching from the normal operational mode to the downward facing operational mode based at least in part on a determination that the altitude angle of the pointing axis is less than a first angular threshold, the first angular threshold less than zero; and
automatically switching from the downward facing operational mode to the normal operational mode based at least in part on a determination that the altitude angle of the pointing axis is greater than a second angular threshold, the second angular threshold, greater than or equal to the first angular threshold.

38. A method according to claim 37 comprising:
automatically switching from the normal operational mode to the downward facing operational mode based at least in part on a determination that the altitude angle of the pointing axis is less than the first angular threshold for a time greater than a first temporal period;
automatically switching from the downward facing operational mode to the normal operational mode based at least in part on a determination that the altitude angle of the pointing axis is greater than the second angular threshold for a time greater than a second temporal period.

39. A method according to claim 31 wherein the modified pointing axis comprises a device plane axis orthogonal to the pointing axis.

40. A method according to claim 31 wherein the database of celestial objects contains additional information in respect of at least some celestial objects and wherein the method comprises displaying at least some of the additional information on the display screen for the one or more selected celestial objects over a plurality of display slices and, in each display slice, displaying at least one of: the at least some of the additional information for a subset of the one or more selected celestial objects; and a portion of the at least some of the additional information for the one or more selected celestial objects.

41. A method according to claim 31 comprising:
repeating determining the altitude angle and the azimuth angle of the pointing axis, accessing the database to determine one or more selected celestial objects for display and displaying graphical representations of the one or more selected celestial objects, such that the sky pattern displayed on the display screen is updated based on the orientation of the device;

pausing the updating of the sky pattern displayed on the display screen in response to user input, so that the sky pattern displayed on the display screen remains static.

42. A method according to claim 41 comprising displaying a user-controllable graphical indicator on the display screen when the updating of the sky pattern displayed on the display screen is paused and allowing a user to select a particular celestial object based on the user moving the graphical indicator on the display screen to a vicinity of the graphical representation of the particular celestial object.

43. A method according to claim 42 comprising, upon selection of the particular celestial object, performing at least one of: outputting information about the particular celestial object to the user; and controlling a motorized telescope to move in a manner such that the particular celestial object comes within its field of view.

44. A method according to claim 41 comprising, when the updating of the sky pattern is paused, at least one of:
panning the sky pattern displayed on the display screen in response to user input; and
zooming in or zooming out the sky pattern displayed on the display screen in response to user input.

45. A method according to claim 31 comprising detecting a presence of a user in proximity to the device and activating the display in response to detecting the presence of the user.

46. A non-transitory computer-readable medium comprising program instructions, which when executed by a suitably configured processor, cause the processor to perform the method of claim 31.

47. A method for displaying a sky pattern comprising graphical representations of one or more celestial objects and additional information in respect of the celestial objects on a limited-size display screen of a hand-held device, the method comprising:
providing a database of celestial objects comprising data corresponding to graphical representations of the celestial objects and additional information in respect of at least some of the celestial objects;
displaying graphical representations of one or more selected celestial objects on the display screen;
displaying at least some of the additional information on the display screen for the one or more selected celestial objects;
wherein displaying the at least some of the additional information on the display screen for the one or more selected celestial objects comprises displaying the at least some of the additional information on the display screen over a plurality of display slices and, in each display slice, displaying at least one of: the at least some of the additional information for a corresponding subset of the one or more selected celestial objects, the corresponding subset different for each display slice; and a corresponding portion of the at least some of the additional information for the one or more selected celestial objects, the corresponding portion different for each display slice;
wherein displaying the at least some of the additional information on the display screen over the plurality of display slices comprises successively displaying each of the plurality of display slices for a period of time to thereby serially display the plurality of display slices over time;
the method further comprising:
providing the device with one or more sensors for sensing information about an orientation of the device;
determining an altitude angle of a pointing axis of the device and an azimuthal angle of the pointing axis based at least in part on the sensed orientation information;
accessing the database and determining, from within the database, the one or more selected celestial objects for display based at least in part on a measure of proximity of the celestial objects to the pointing axis; and
operating the device sequentially in each of:
a normal orientation mode; and
a downward facing orientation mode, which comprises determining a modified altitude angle of a modified pointing axis and a modified azimuthal angle of the modified pointing axis based at least in part on the sensed orientation information and substituting the modified pointing axis in place of the pointing axis for determining the one or more selected celestial objects for display;
wherein the modified pointing axis is related to the pointing axis via a coordinate system rotation transformation.

48. A method according to claim 47 comprising repeating determining the altitude angle and the azimuth angle of the pointing axis, accessing the database to determine one or more selected celestial objects for display and displaying graphical representations of the one or more selected celestial objects, such that the sky pattern displayed on the display screen is updated based on the orientation of the device.

49. A method according to claim 47 wherein displaying the at least some of the additional information on the display screen over a plurality of display slices comprises displaying, in each time slice, the at least some of the additional information for a subset of the one or more selected celestial objects and the method comprises determining inclusion of the one or more selected celestial objects in a particular subset based on one or more of: types of celestial objects; distances of celestial objects from earth; ages of celestial objects; alphabetic order of names of celestial objects; and brightness levels of celestial objects.

50. A method according to claim 48 comprising repetitively cycling through the plurality of display slices based on one or more of: a display time period associated with each display slice; and receiving user toggle inputs.

51. A method according to claim 50 comprising pausing the repetitive cycle through the plurality of display slices in response to user input.

52. A method according to claim 50 comprising, in at least one of the plurality of display slices, displaying the graphical representations of the one or more selected celestial objects without any of the additional information.

53. A method according to claim 51 comprising, when the updating of the sky pattern is paused, at least one of:
panning the sky pattern displayed on the display screen in response to user input; and
zooming in or zooming out the sky pattern displayed on the display screen in response to user input.

54. A method according to claim 48 comprising pausing the updating of the sky pattern displayed on the display screen in response to user input, so that the sky pattern displayed on the display screen remains static.

55. A method according to claim 54 comprising displaying a user-controllable graphical indicator on the display screen when the updating of the sky pattern displayed on the display screen is paused and allowing a user to select a particular celestial object based on the user moving the graphical indicator on the display screen to a vicinity of the graphical representation of the particular celestial object.

56. A method according to claim 55 comprising, upon selection of the particular celestial object, performing at least one of: outputting information about the particular celestial object to the user; and controlling a motorized telescope to move in a manner such that the particular celestial object comes within its field of view.

57. A method according to claim 47 comprising detecting a presence of a user in proximity to the device and activating the display in response to detecting the presence of the user.

58. A method according to claim 47 comprising operating in the downward facing orientation mode or the normal orientation mode based on user input.

59. A method according to claim 47 comprising automatically switching between the downward facing orientation mode and the normal orientation mode based at least in part on the altitude angle of the pointing axis.

60. A method according to claim 59 comprising:
automatically switching from the normal operational mode to the downward facing operational mode based at least in part on a determination that the altitude angle of the pointing axis is less than a first angular threshold, the first angular threshold less than zero; and
automatically switching from the downward facing operational mode to the normal operational mode based at least in part on a determination that the altitude angle of the pointing axis is greater than a second angular threshold, the second angular threshold, greater than or equal to the first angular threshold.

61. A method according to claim 60 comprising:
automatically switching from the normal operational mode to the downward facing operational mode based at least in part on a determination that the altitude angle of the pointing axis is less than the first angular threshold for a time greater than a first temporal period;
automatically switching from the downward facing operational mode to the normal operational mode based at least in part on a determination that the altitude angle of the pointing axis is greater than the second angular threshold for a time greater than a second temporal period.

* * * * *